US012016010B2

(12) United States Patent
Gulati et al.

(10) Patent No.: US 12,016,010 B2
(45) Date of Patent: Jun. 18, 2024

(54) TRANSMISSION CONFIGURATION INDICATION STATE CONFIGURATION FOR SENSING-ASSISTED COMMUNICATION

(71) Applicant: QUALCOMM Incorporated, San Diego, CA (US)

(72) Inventors: Kapil Gulati, Belle Mead, NJ (US); Junyi Li, Fairless Hills, PA (US); Preeti Kumari, San Diego, CA (US); Saadallah Kassir, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 17/510,085

(22) Filed: Oct. 25, 2021

(65) Prior Publication Data

US 2023/0129783 A1    Apr. 27, 2023

(51) Int. Cl.
*H04W 72/12*    (2023.01)
*H04W 72/044*    (2023.01)
(Continued)

(52) U.S. Cl.
CPC ..... *H04W 72/1263* (2013.01); *H04W 72/046* (2013.01); *H04W 92/18* (2013.01)

(58) Field of Classification Search
CPC .......... H04W 72/1263; H04W 72/046; H04W 92/18; H04W 72/1268; H04W 16/28; H04W 7/063; H04W 72/00; H04B 7/063; H04B 7/0695; H04B 7/088; H04B 5/00; H04B 7/06; H04B 7/08
See application file for complete search history.

(56) References Cited

U.S. PATENT DOCUMENTS

2020/0119875 A1*  4/2020  John Wilson .......... H04B 7/088
2021/0235328 A1*  7/2021  Hui ....................... H04W 72/56
(Continued)

FOREIGN PATENT DOCUMENTS

WO    WO-2020264329 A1 * 12/2020 ........... H04B 17/318

OTHER PUBLICATIONS

International Search Report and Written Opinion—PCT/US2022/077466—ISA/EPO—dated Jan. 29, 2023.
(Continued)

*Primary Examiner* — Mewale A Ambaye
(74) *Attorney, Agent, or Firm* — Holland & Hart LLP

(57) ABSTRACT

Methods, systems, and devices for wireless communication are described. In some wireless communications systems, a first device may receive a feedback message from a second device that indicates a set of one or more sensing results associated with a sensing procedure performed by the second device. The first device may transmit, to the second device, a control message indicating resource information for a message for the second device. The control message may include an indication of a transmission configuration indication (TCI) state indicating a quasi-colocation (QCL) relationship between a reference signal associated with the message and a sensing result of the set of one or more sensing results indicated by the feedback message. The first device may transmit the message using a transmit beam and the second device may receive the message using a receive beam based on the TCI state and the QCL relationship.

26 Claims, 14 Drawing Sheets

(51) Int. Cl.
*H04W 72/1263* (2023.01)
*H04W 92/18* (2009.01)

(56) References Cited

U.S. PATENT DOCUMENTS

2021/0314917 A1* 10/2021 Lee ...................... H04W 72/02
2022/0346065 A1* 10/2022 Hui ................... H04W 72/0446

OTHER PUBLICATIONS

ZTE: "Enhancements on Multi-beam Operation", 3GPP TSG RAN WG1 Meeting #103-e, R1-2007763, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020, XP051946497, 19 Pages, Retrieved on Oct. 24, 2020, Section 2, Sections 2.1.2 , 2.2.2, 2.2.3, 2.4, p. 1-p. 5.

* cited by examiner

TRANSMISSION CONFIGURATION INDICATION STATE CONFIGURATION FOR SENSING-ASSISTED COMMUNICATION

FIELD OF TECHNOLOGY

The following relates to wireless communication, including transmission configuration indication (TCI) state configuration for sensing-assisted communication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, one or more wireless devices, such as UEs, base stations, or both may support beamformed communications. A transmitting device may indicate, to a receiving device, a transmission configuration indication (TCI) state associated with a message for the receiving device. The receiving device may select a receive beam to use for receiving the message based on the TCI state, but such techniques may be deficient in some scenarios.

SUMMARY

The described techniques relate to improved methods, systems, devices, and apparatuses that support transmission configuration indication (TCI) state configuration for sensing-assisted communication. Generally, the described techniques provide for a TCI state configuration that defines a relationship between a reference signal and a sensing result indicated via a feedback message. For example, a first device (e.g., a UE, a base station, or any other wireless device) may support beamformed communications with a second device (e.g., a UE, a base station, or any other wireless device). The first device and the second device may each perform sensing of an environment around the devices. The first device may receive a feedback message from the second device that indicates one or more sensing results associated with the sensing performed by the second device. In some examples, the sensing results may be monostatic sensing results associated with a monostatic channel between the second device and a reflective object, which may be referred to as a reflector or a cluster herein.

The first device, which may be referred to as a transmitting device, may transmit a control message indicating resource information for a message to be transmitted to the second device, which may be referred to as a receiving device. The control message may include an indication of a TCI state that defines a quasi-colocation (QCL) relationship between a target reference signal associated with the message and a sensing result of the one or more sensing results included in the feedback message. The first device may transmit the message using a transmit beam and the second device may receive the message using a receive beam. The transmit and receive beams may be based on the TCI state and the QCL relationship. For example, the second device may select a receive beam that is associated with the sensing result indicated via the QCL relationship. The devices may thereby support a TCI state configuration for sensing-assisted beam management.

A method for wireless communication at a first wireless device is described. The method may include receiving, from a second wireless device, a feedback message that indicates a set of one or more sensing results associated with a sensing procedure performed by the second wireless device, transmitting, to the second wireless device, a control message indicating resource information for a message for the second wireless device, the control message including an indication of a TCI state indicating a QCL relationship between a reference signal associated with the message and a sensing result of the set of one or more sensing results indicated by the feedback message, and transmitting, to the second wireless device, the message using a transmit beam based on the TCI state and the QCL relationship.

An apparatus for wireless communication at a first wireless device is described. The apparatus may include a processor, memory coupled with the processor, and instructions stored in the memory. The instructions may be executable by the processor to cause the apparatus to receive, from a second wireless device, a feedback message that indicates a set of one or more sensing results associated with a sensing procedure performed by the second wireless device, transmit, to the second wireless device, a control message indicating resource information for a message for the second wireless device, the control message including an indication of a TCI state indicating a QCL relationship between a reference signal associated with the message and a sensing result of the set of one or more sensing results indicated by the feedback message, and transmit, to the second wireless device, the message using a transmit beam based on the TCI state and the QCL relationship.

Another apparatus for wireless communication at a first wireless device is described. The apparatus may include means for receiving, from a second wireless device, a feedback message that indicates a set of one or more sensing results associated with a sensing procedure performed by the second wireless device, means for transmitting, to the second wireless device, a control message indicating resource information for a message for the second wireless device, the control message including an indication of a TCI state indicating a QCL relationship between a reference signal associated with the message and a sensing result of the set of one or more sensing results indicated by the feedback message, and means for transmitting, to the second wireless device, the message using a transmit beam based on the TCI state and the QCL relationship.

A non-transitory computer-readable medium storing code for wireless communication at a first wireless device is described. The code may include instructions executable by a processor to receive, from a second wireless device, a feedback message that indicates a set of one or more sensing results associated with a sensing procedure performed by the second wireless device, transmit, to the second wireless device, a control message indicating resource information for a message for the second wireless device, the control message including an indication of a TCI state indicating a QCL relationship between a reference signal associated with the message and a sensing result of the set of one or more sensing results indicated by the feedback message, and transmit, to the second wireless device, the message using a transmit beam based on the TCI state and the QCL relationship.

In some examples of the method, apparatuses, and non-transitory computer-readable medium described herein, transmitting the message may include operations, features, means, or instructions for transmitting the message via a bistatic channel between the first wireless device and the second wireless device, the bistatic channel based on the set of one or more sensing results, a second set of one or more sensing results associated with a second sensing procedure performed by the first wireless device, or both.

Some examples of the method, apparatuses, and non-transitory computer-readable medium described herein may further include operations, features, means, or instructions for performing the second sensing procedure by the first wireless device, determining an association between the sensing result of the set of one or more sensing results indicated by the feedback message and a second sensing result of the second set of one or more sensing results associated with the second sensing procedure, and transmitting the message via the bistatic channel based on the association.

In some examples of the method, apparatuses, and non-transitory computer-readable medium described herein, each sensing result of the set of one or more sensing results may indicate a first set of one or more parameters associated with a respective monostatic channel at the second wireless device, each sensing result of the second set of one or more sensing results may indicate a second set of one or more parameters associated with a respective monostatic channel at the first wireless device, and each of the first set of one or more parameters and the second set of one or more parameters may include an angle, a delay, a doppler, a velocity, an angle spread, a delay spread, a doppler spread, or any combination thereof of the respective monostatic channel at the first wireless device or the second wireless device.

In some examples of the method, apparatuses, and non-transitory computer-readable medium described herein, the sensing procedure, the second sensing procedure, or both may include a radar sensing procedure or a lidar sensing procedure.

Some examples of the method, apparatuses, and non-transitory computer-readable medium described herein may further include operations, features, means, or instructions for transmitting one or more reference signals associated with the message, the one or more reference signals including at least the reference signal, where the TCI state indicates the QCL relationship between the one or more reference signals associated with the message and a subset of one or more sensing results of the set of one or more sensing results indicated by the feedback message, the subset of one or more sensing results including at least the sensing result.

In some examples of the method, apparatuses, and non-transitory computer-readable medium described herein, transmitting the control message may include operations, features, means, or instructions for transmitting the control message including the indication of the QCL relationship between the reference signal and the sensing result of the set of one or more sensing results indicated by the feedback message based on a receive timing of the feedback message.

Some examples of the method, apparatuses, and non-transitory computer-readable medium described herein may further include operations, features, means, or instructions for receiving the feedback message within a slot and transmitting the control message that indicates the QCL relationship and the slot in which the feedback message may be received.

In some examples of the method, apparatuses, and non-transitory computer-readable medium described herein, receiving the feedback message may include operations, features, means, or instructions for receiving, via the feedback message, an indication of a location of the second wireless device, an orientation of the second wireless device, a speed of the second wireless device, or any combination thereof.

In some examples of the method, apparatuses, and non-transitory computer-readable medium described herein, transmitting the control message may include operations, features, means, or instructions for transmitting a reference signal resource configuration indicating the resource information for the transmission, where the message may include a channel state information reference signal (CSI-RS)

In some examples of the method, apparatuses, and non-transitory computer-readable medium described herein, transmitting the control message may include operations, features, means, or instructions for transmitting downlink control information (DCI) indicating the resource information for the transmission, where the message may include a physical data channel transmission.

In some examples of the method, apparatuses, and non-transitory computer-readable medium described herein, each sensing result of the set of one or more sensing results may be associated with a respective receive beam of a set of multiple receive beams at the second wireless device.

A method for wireless communication at a second wireless device is described. The method may include transmitting, to a first wireless device, a feedback message that indicates a set of one or more sensing results associated with a sensing procedure performed by the second wireless device, receive, from the first wireless device, a control message indicating resource information for a message for the second wireless device, the control message including an indication of a TCI state that indicates a QCL relationship between a reference signal associated with the message and a sensing result of the set of one or more sensing results indicated by the feedback message, and receiving, from the first wireless device, the message using a receive beam based on the TCI state and the QCL relationship.

An apparatus for wireless communication at a second wireless device is described. The apparatus may include a processor, memory coupled with the processor, and instructions stored in the memory. The instructions may be executable by the processor to cause the apparatus to transmit, to a first wireless device, a feedback message that indicates a set of one or more sensing results associated with a sensing procedure performed by the second wireless device, receive, from the first wireless device, a control message indicating resource information for a message for the second wireless device, the control message including an indication of a TCI state that indicates a QCL relationship between a reference signal associated with the message and a sensing result of the set of one or more sensing results indicated by the feedback message, and receive, from the first wireless device, the message using a receive beam based on the TCI state and the QCL relationship.

Another apparatus for wireless communication at a second wireless device is described. The apparatus may include means for transmitting, to a first wireless device, a feedback message that indicates a set of one or more sensing results associated with a sensing procedure performed by the second wireless device, means for receive, from the first wireless device, a control message indicating resource information for a message for the second wireless device, the control message including an indication of a TCI state that indicates a QCL relationship between a reference signal associated with the message and a sensing result of the set of one or more sensing results indicated by the feedback message, and means for receiving, from the first wireless device, the message using a receive beam based on the TCI state and the QCL relationship.

A non-transitory computer-readable medium storing code for wireless communication at a second wireless device is described. The code may include instructions executable by a processor to transmit, to a first wireless device, a feedback message that indicates a set of one or more sensing results associated with a sensing procedure performed by the second wireless device, receive, from the first wireless device, a control message indicating resource information for a message for the second wireless device, the control message including an indication of a TCI state that indicates a QCL relationship between a reference signal associated with the message and a sensing result of the set of one or more sensing results indicated by the feedback message, and receive, from the first wireless device, the message using a receive beam based on the TCI state and the QCL relationship.

In some examples of the method, apparatuses, and non-transitory computer-readable medium described herein, receiving the message may include operations, features, means, or instructions for receiving the message via a bistatic channel between the first wireless device and the second wireless device, the bistatic channel based on the set of one or more sensing results, a second set of one or more sensing results associated with a second sensing procedure performed by the first wireless device, or both.

In some examples of the method, apparatuses, and non-transitory computer-readable medium described herein, the bistatic channel may be based on an association between the sensing result of the set of one or more sensing results indicated by the feedback message and a second sensing result of the second set of one or more sensing results associated with the second sensing procedure performed by the first wireless device.

In some examples of the method, apparatuses, and non-transitory computer-readable medium described herein, each sensing result of the set of one or more sensing results may indicate a first set of one or more parameters associated with a respective monostatic channel at the second wireless device, each sensing result of the second set of one or more sensing results may indicate a second set of one or more parameters associated with a respective monostatic channel at the first wireless device, and each of the first set of one or more parameters and the second set of one or more parameters may include an angle, a delay, a doppler, a velocity, an angle spread, a delay spread, a doppler spread, or any combination thereof of the respective monostatic channel at the first wireless device or the second wireless device.

In some examples of the method, apparatuses, and non-transitory computer-readable medium described herein, the sensing procedure, the second sensing procedure, or both may include a radar sensing procedure or a lidar sensing procedure.

Some examples of the method, apparatuses, and non-transitory computer-readable medium described herein may further include operations, features, means, or instructions for receiving one or more reference signals associated with the message, the one or more reference signals including at least the reference signal, where the TCI state may indicate the QCL relationship between the one or more reference signals associated with the transmission and a subset of one or more sensing results of the set of one or more sensing results indicated by the feedback message, the subset of one or more sensing results including at least the sensing result.

In some examples of the method, apparatuses, and non-transitory computer-readable medium described herein, receiving the control message may include operations, features, means, or instructions for receiving the control message including the indication of the QCL relationship between the reference signal and the sensing result of the set of one or more sensing results indicated by the feedback message based on a transmit timing associated with the feedback message.

Some examples of the method, apparatuses, and non-transitory computer-readable medium described herein may further include operations, features, means, or instructions for transmitting the feedback message within a slot and receiving the control message that indicates the QCL relationship and the slot in which the feedback message may be transmitted.

In some examples of the method, apparatuses, and non-transitory computer-readable medium described herein, transmitting the feedback message may include operations, features, means, or instructions for transmitting, via the feedback message, an indication of a location of the second wireless device, an orientation of the second wireless device, a speed of the second wireless device, or any combination thereof.

In some examples of the method, apparatuses, and non-transitory computer-readable medium described herein, receiving the control message may include operations, features, means, or instructions for receiving a reference signal resource configuration indicating the resource information for the message, where the message may include a CSI-RS.

In some examples of the method, apparatuses, and non-transitory computer-readable medium described herein, receiving the control message may include operations, features, means, or instructions for receiving DCI indicating the resource information for the message, where the message may include a physical data channel transmission.

Some examples of the method, apparatuses, and non-transitory computer-readable medium described herein may further include operations, features, means, or instructions for selecting the receive beam from a set of multiple receive beams at the second wireless device based on the QCL relationship indicating the sensing result, where each sensing result of the set of one or more sensing results may be associated with a respective receive beam of the set of multiple receive beams at the second wireless device.

DETAILED DESCRIPTION

Figure 1:
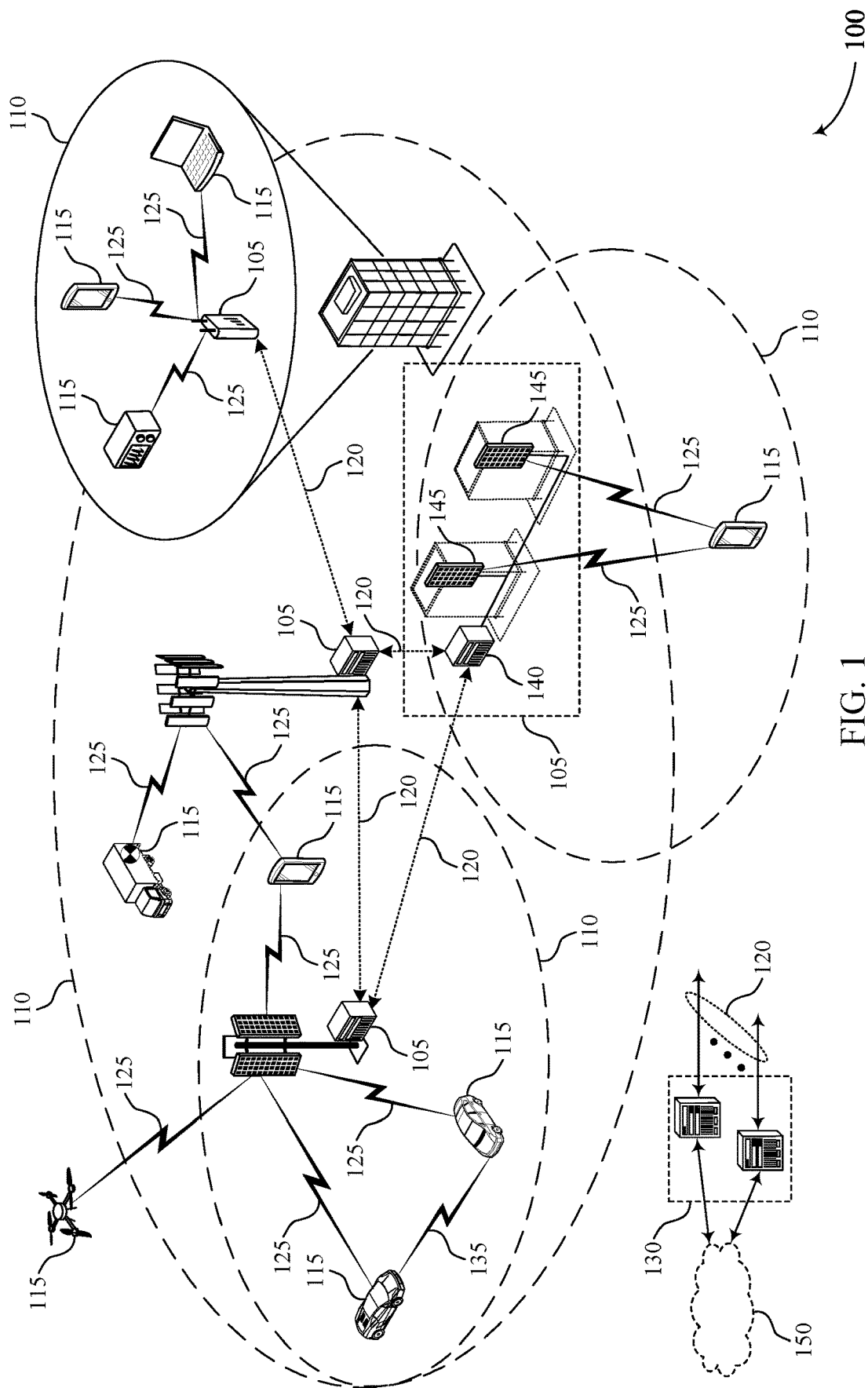
FIG. 1 illustrates an example of a wireless communications system that supports transmission configuration indication (TCI) state configuration for sensing-assisted communication in accordance with aspects of the present disclosure.

A wireless communications system may include communication devices, such as a base station (e.g., an eNodeB (eNB), a next generation NodeB or a giga NodeB, any of which may be referred to as a gNB, or some other base station) or a user equipment (UE) that may support multiple radio access technologies. Examples of radio access technologies include fourth generation (4G) systems, such as Long Term Evolution (LTE) systems, and fifth generation (5G) systems, which may be referred to as New Radio (NR) systems. In the wireless communications system, a transmitting device may indicate which receive beam a receiving device should use to receive a subsequent message to be transmitted to the receiving device. For example, the transmitting device may transmit a control message that includes a transmission configuration indicator (TCI) state configuration. The TCI state configuration may define a quasi-colocation (QCL) relationship between a reference signal associated with the data (e.g., a target reference signal) and another, previously transmitted reference signal (e.g., a source reference signal). The receiving device may receive the data using a receive beam associated with the source reference signal based on the TCI state configuration. The transmitting device and the receiving device may be any of a UE, a base station, or any other wireless device.

Some wireless communications systems may support sensing-assisted communications, in which a transmitting device may infer a bistatic communication path via a reflector between the transmitting device and a receiving device based on monostatic sensing performed by each device. To perform monostatic sensing, a device may transmit signals and measure a strength or quality of a reflection of the signals at the device. The signals may be radar signals, lidar signals, or some other signals that may reflect off of a physical object that may reflect such signals, which may be referred to as a reflector or a cluster herein. The device may estimate one or more parameters associated with each monostatic channel at the device. The parameters may include an angle, a delay, a doppler, or any combination thereof of the respective monostatic channel between the device and a reflector.

The transmitting device and the receiving device may communicate via the bistatic channel based on the monostatic sensing information obtained by each device. For example, a receiving device may transmit a feedback message to a transmitting device to indicate one or more sensing results obtained by the receiving device, and the transmitting device may infer a bistatic channel (e.g., via a reflection of a cluster or reflector) based on the sensing results in the feedback message and sensing results obtained by the transmitting device. In some cases, however, the transmitting device may not indicate which receive beam the receiving device should use to receive a transmission via the bistatic channel. For example, a TCI state configuration that defines a relationship between a target reference signal and a source reference signal may not support beam selection for a bistatic channel based on monostatic sensing results at each device.

To improve sensing-assisted communications, an enhanced TCI state indication is described herein. The enhanced TCI state indication may indicate a QCL relationship between a bistatic transmission (e.g., a message to be transmitted via a bistatic channel) and one or more sensing results of a set of sensing results indicated in a feedback message. The set of sensing results may be grouped and assigned a respective index within the feedback message according to a cluster that corresponds to each sensing result, and the TCI state may indicate an index of a target cluster associated with the bistatic channel. The receiving device may identify one or more sensing results associated with the indicated index in the feedback message and determine to use a receive beam associated with the one or more sensing results to receive the bistatic transmission. The transmitting device may indicate the TCI state via a control message. The control message may indicate resource information for the bistatic transmission in addition to the TCI state indication. The control message may be, for example, downlink control information (DCI) or a resource configuration. The devices may thereby support a TCI state configuration that defines a QCL relationship between a transmission and a monostatic sensing result to improve communication reliability and throughput and reduce latency associated with a beam selection procedure.

Aspects of the disclosure are initially described in the context of wireless communications systems. Additional aspects of the disclosure are described with reference to a sensing-assisted communication diagram and a process flow. Aspects of the disclosure are further illustrated by and described with reference to apparatus diagrams, system diagrams, and flowcharts that relate to TCI state configuration for sensing-assisted communication.

FIG. 1 illustrates an example of a wireless communications system 100 that supports TCI state configuration for sensing-assisted communication in accordance with aspects of the present disclosure. The wireless communications system 100 may include one or more base stations 105, one or more UEs 115, and a core network 130. In some examples, the wireless communications system 100 may be a LTE network, an LTE-Advanced (LTE-A) network, an LTE-A Pro network, or an NR network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNB, a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, the wireless communications system 100 may include one or more wireless devices, such as a UE 115, a base station 105, or another type of wireless device, that may support sensing-assisted beamformed communications. For example, a transmitting device may infer a bistatic communication path via a reflector between the transmitting device and a receiving device based on monostatic sensing performed by each device. As described herein, the transmitting device may indicate a TCI state configuration associated with the bistatic transmission to the receiving device. The TCI state configuration may define a relationship between a target reference signal and a monostatic sensing result.

The transmitting device and the receiving device may each perform sensing of an environment around the respective devices. The receiving device may transmit a feedback message to the transmitting device to indicate a set of sensing results associated with the sensing performed by the receiving device. In some examples, the sensing results may be monostatic sensing results associated with a monostatic channel between the receiving device and a reflective object, which may be referred to as a reflector or a cluster herein. The transmitting device may transmit a control message indicating resource information for a message to be transmitted to the receiving device via a bistatic channel. The control message may include an indication of a TCI state that defines a QCL relationship between a target reference signal associated with the message and a sensing result of the set of sensing results included in the feedback message. The transmitting device may transmit the message using a transmit beam and the receiving device may receive the message using a receive beam. The transmit and receive beams may be based on the TCI state and the QCL relationship. For example, the receiving device may select a receive beam that is associated with the sensing result indicated via the QCL relationship. The devices may thereby support a TCI state configuration for sensing-assisted beam management.

Figure 2:
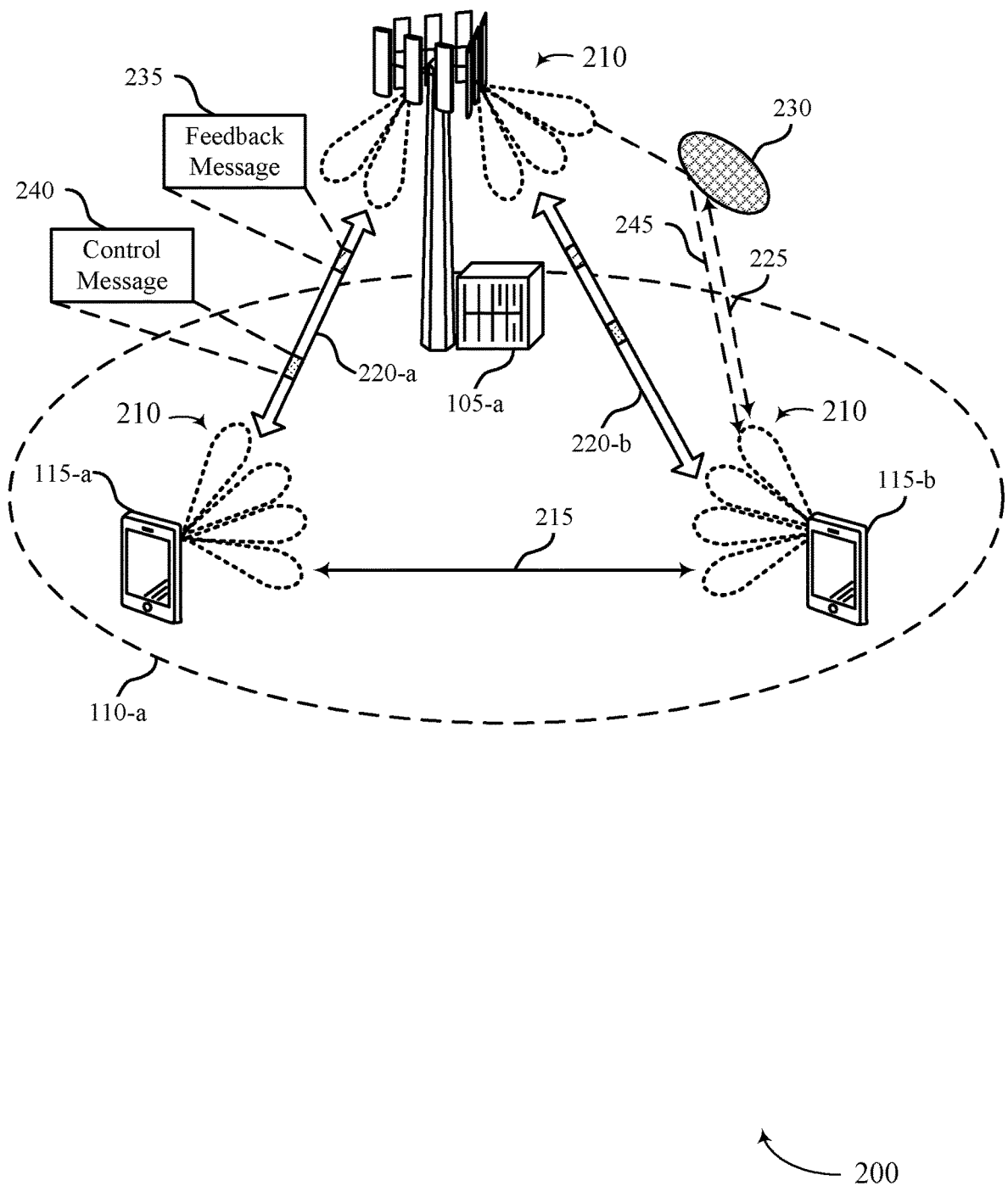
FIG. 2 illustrates an example of a wireless communications system that supports TCI state configuration for sensing-assisted communication in accordance with aspects of the present disclosure.

FIG. 2 illustrates an example of a wireless communications system 200 that supports TCI state configuration for sensing-assisted communication in accordance with aspects of the present disclosure. The wireless communications system 200 may include a base station 105-a and UEs 115-a and 115-b (e.g., among other UEs 115), which may represent examples of a base station 105 and a UE 115 as described with reference to FIG. 1. The base station 105-a may communicate with the UEs 115-a and 115-b within a geographic coverage area 110-a and via communication links 220-a and 220-b, respectively. The UEs 115-a and 115-b may Additionally, or alternatively support sidelink communications via a sidelink communication link 215.

The wireless communications system 200 may support beamformed communications. The base station 105-a and the UEs 115-a and 115-b may each transmit and receive wireless communications using one or more beams 210. The beams 210 may, in some examples, be referred to as UE beams 210, base station beams 210, transmit beams 210, receive beams 210, or any combination thereof. The UE 115-a, the UE 115-b, the base station 105-a, or any combination thereof may be referred to as a receiving device or a transmitting device based on a direction of communications between the devices. For example, if the UE 115-a has data to transmit to the UE 115-b, the UE 115-a may be referred to as a transmitting device and may use a transmit beam 210 to transmit the data. The UE 115-b may be referred to as a receiving device and may use a corresponding receive beam 210 to receive the data from the UE 115-*a*.

One or more of the devices in the wireless communications system 200 may perform beam training to identify a beam 210 to use for a certain type of communication. To perform a beam training operation, a transmitting device may transmit one or more reference signals to a receiving device and the receiving device may identify a receive beam 210 (e.g., a preferred or best receive beam 210) to use for receiving each reference signal. The transmitting device may transmit each reference signal using one or more transmit beams 210. The reference signals may be referred to as source reference signals. The source reference signals may be, for example, synchronization signal blocks (SSBs), tracking reference signals (TRSs), CSI-RSs for beam management, some other type of reference signals, or any combination thereof. In one example of a beam training procedure, the base station 105-*a* may transmit one or more reference signals to the UE 115-*a*. The UE 115-*a* may perform beam training to identify a preferred receive beam 210 for each type of reference signal received at the UE 115-*a*.

The transmitting device may transmit a message (e.g., a data message, a control message, a reference signal, or the like) to the receiving device using a transmit and receive beam pair based on a beam training procedure. The transmitting device may indicate, to the receiving device prior to the transmission, a transmit beam 210 the transmitting device will use to transmit the message, a receive beam 210 for the receiving device to use to receive the message, or both via a TCI state configuration. The transmitting device may transmit a control message 240 that indicates resource information for the message to be transmitted and indicates the TCI state configuration associated with the message. Each UE 115 or other receiving device may be configured with a quantity of TCI states (e.g., M TCI states), and the transmitting device may indicate the TCI state from the configured quantity of TCI states.

Each TCI state may define a QCL assumption (e.g., relationship) between a previously transmitted source reference signal and a target reference signal associated with the message. The target reference signal may be a reference signal that is associated with (e.g., "QCLed" with) or included in the scheduled message. The target reference signal may be, for example, one or more of a TRS, a CSI-RS for beam management, a CSI-RS for channel quality index (CQI), a demodulation reference signal (DMRS) for physical downlink shared channel (PDSCH), a DMRS for physical downlink control channel (PDCCH), or some other type of reference signal. Each target reference signal may be associated with a transmit beam 210 used by the transmitting device to transmit the message. The source reference signal may correspond to a reference signal transmitted during a beam training procedure, and the receiving device may identify a preferred receive beam 210 associated with the source reference signal based on the beam training. The TCI state may thereby indicate a transmit beam 210 and a receive beam 210 associated with the message. The receiving device may use the identified receive beam 210 to receive the message.

In one example, the base station 105-*a* may have data to transmit to the UE 115-*a* via a downlink channel, such as a PDSCH. The base station 105-*a* may transmit the control message 240 to the UE 115-*a* to indicate a TCI state that defines a QCL relationship between a DMRS for PDSCH associated with the data transmission and an SSB with an index of two. The control message 240 may, in some examples, include DCI that schedules or corresponds to the PDSCH. The UE 115-*a* may have previously performed beam training and identified a preferred receive beam associated with the SSB with an index of two. The UE 115-*a* may determine to use the receive beam 210 to receive the data transmission. The UE 115-*a* may thereby determine a receive beam 210 to use based on a beam management procedure and a relationship between a certain transmit beam at the base station 105-*a* and a certain downlink reference signal (e.g., SSB index 'n').

The wireless communications system 200 may support sensing-assisted beam management. For example, the UE 115-*a*, the UE 115-*b*, the base station 105-*a*, or any combination thereof may each perform sensing of an environment around the respective device. The sensing may, in some examples, include monostatic radar or lidar sensing. To perform monostatic sensing, a device may transmit signals in one or more directions (e.g., using one or more beams 210) and measure a signal strength or quality of the signals that are reflected and received at the device. The signals may include radar signals, lidar signals, or both. The signals may be reflected off of one or more physical objects in the environment, which may be referred to as reflectors or clusters 230. The clusters 230 may be static objects or dynamic objects (e.g., a vehicle) that reflect radar or lidar signals. A signal path that begins and ends at a same device may be referred to as a monostatic channel 225. For example, the UE 115-*b* may transmit and receive signals reflected off of the cluster 230 via the monostatic channel 225. The UE 115-*b* (e.g., and each other wireless device) may additionally transmit and receive signals via one or more other monostatic channels 225 each associated with a respective cluster 230.

Each device may perform monostatic sensing to identify one or more clusters 230 that are near the device and a set of parameters associated with each cluster 230 and corresponding monostatic channel 225. The parameters may include an angle, an angle spread, a delay, a delay spread, a doppler, or any combination thereof associated with the monostatic channel 225 between the device and the respective cluster 230. The device may organize or group the sensing results per cluster 230. That is, if the device obtains sensing results for multiple monostatic channels 225 between the device and multiple clusters 230, the device may assign an index to each cluster and group or average the sensing results based on the index associated with the corresponding cluster 230. A receiving device may transmit a feedback message 235 to a transmitting device to indicate the sensing results.

The transmitting device may associate self-sensing results obtained by a sensing procedure performed at the transmitting device with the sensing results received via the feedback message 235 to infer a bistatic communication channel 245 between the transmitting device and the receiving device (e.g., via the reflection of a cluster 230). The transmitting device may determine (e.g., estimate or assume) an angle, a delay, a doppler, or any combination thereof of the potential bistatic communication channel 245. In some examples, the feedback message 235 may include one or more parameters associated with the receiving device, such as a location, an orientation, a speed, or any combination thereof of the receiving device. The transmitting device may use the one or more parameters to infer the bistatic channel 245.

In one example, the base station 105-*a* may receive a feedback message 235 from the UE 115-*b* and determine the bistatic channel 245 via the reflection of the cluster 230. The base station 105-*a* may assume that the bistatic channel 245 is a potential or feasible bistatic communication path based on an association between one or more sensing results in the feedback message 235 associated with the cluster 230 and one or more other sensing results associated with the cluster 230 that are obtained by the base station 105-*a*. Procedures for inferring and establishing a bistatic communication channel 245 may be described in further detail herein, including with reference to FIG. 3.

A transmitting device may thereby identify the feasible bistatic channel 245 and transmit a data message, a control message, a reference signal (e.g., a CSI-RS), or any combination thereof to a receiving device via the bistatic channel 245 using a transmit beam 210 associated with a target cluster 230 (e.g., a cluster 230 that reflects the bistatic channel 245). In some cases, however, one or more TCI states configured at the receiving device may be associated with beam training procedures performed via a direct communication link 220 or a direct sidelink communication link 215 between the transmitting device and the receiving device. In such cases, the one or more TCI states may define a QCL relationship between a transmission and a previously transmitted downlink or sidelink source reference signal. If the receiving device uses a receive beam 210 associated with a source reference signal to receive a bistatic transmission, the receive beam 210 may point in a different direction than the bistatic channel 245, such that the receiving device may not receive the bistatic transmission. As such, the transmitting device may not indicate, to the receiving device, which receive beam 210 to use to receive the bistatic transmission, which may result in reduced reliability and throughput.

An enhanced TCI state as described herein may define a QCL relationship between a target reference signal and a sensing result (e.g., a monostatic sensing result) of a set of one or more sensing results indicated via a feedback message 235. A transmitting device may indicate the TCI state to a receiving device via a control message 240, and the receiving device may determine to use a receive beam 210 associated with the indicated sensing result to receive a subsequent communication. In some examples, the transmitting device may transmit the control message 240 in response to receiving the feedback message 235. The control message 240 may configure the receiving device to receive a transmission via the bistatic channel 245. For example, if the transmission is a reference signal, such as a CSI-RS or other reference signal, the transmitting device may transmit a CSI-RS resource configuration to the receiving device to indicate resource information associated with the reference signal. The control message 240 may include the CSI-RS resource configuration and the indication of the TCI state. Alternatively, if the transmission is a data transmission via a physical data channel (e.g., a PDSCH or a PSSCH), the transmitting device may transmit DCI to the receiving device to schedule the data transmission and indicate resource information associated with the data transmission. The control message 240 may include the DCI and the indication of the TCI state.

In some examples, the sensing result indicated via the TCI state may be associated with a target cluster 230. For example, a transmitting device may infer a bistatic channel 245 associated with the target cluster 230, and the transmitting device may indicate a TCI state that relates a target reference signal with an index of the target cluster 230. The receiving device may use the index to identify one or more corresponding sensing results associated with the cluster 230 in the feedback message 235. The receiving device may determine to use a receive beam 210 that associated with the indicated sensing result, which may be in the direction of the target cluster 230. In some examples, the TCI state may provide a QCL relationship between one or more reference signals included in or associated with the transmission and one or more indices of target clusters 230 associated with sensing results in the feedback message 235. For example, a CSI-RS may be spatially "QCLed" with a target cluster having an index n, as indicated in the feedback message 235. Such sensing-assisted beam management techniques may support improved reliability of a beam selection procedure for a bistatic transmission via a cluster 230.

The TCI state indication may, in some examples, correspond to a feedback message 235 most recently transmitted by the receiving device, most recently received by the transmitting device, or both. For example, the TCI state may indicate an index of a sensing result to the receiving device, and the receiving device may be configured to identify the indexed sensing result from a set of sensing results most recently transmitted by the receiving device. Additionally, or alternatively, the transmitting device may indicate a slot (e.g., a slot index) associated with the feedback message 235. The slot may correspond to a slot in which the feedback message 235 was transmitted and received. The transmitting device may indicate the slot via the control message 240, via the TCI state configuration, via other signaling, or any combination thereof. The receiving device may determine, based on the indication of the slot and the TCI state, that the index indicated by the TCI state corresponds to an indexed sensing result of a set of sensing results included in a feedback message 235 that was transmitted in the indicated slot.

Wireless devices as described herein, such the base station 105-*a*, the UE 115-*a*, and the UE 115-*b*, another wireless device, or any combination thereof may thereby support sensing-assisted beam management. A TCI state as described herein may be configured to define a QCL relationship between a target reference signal and a sensing result indicated via a feedback message, which may provide for an improved receive beam selection procedure by a receiving device during sensing-assisted bistatic communications.

Figure 3:
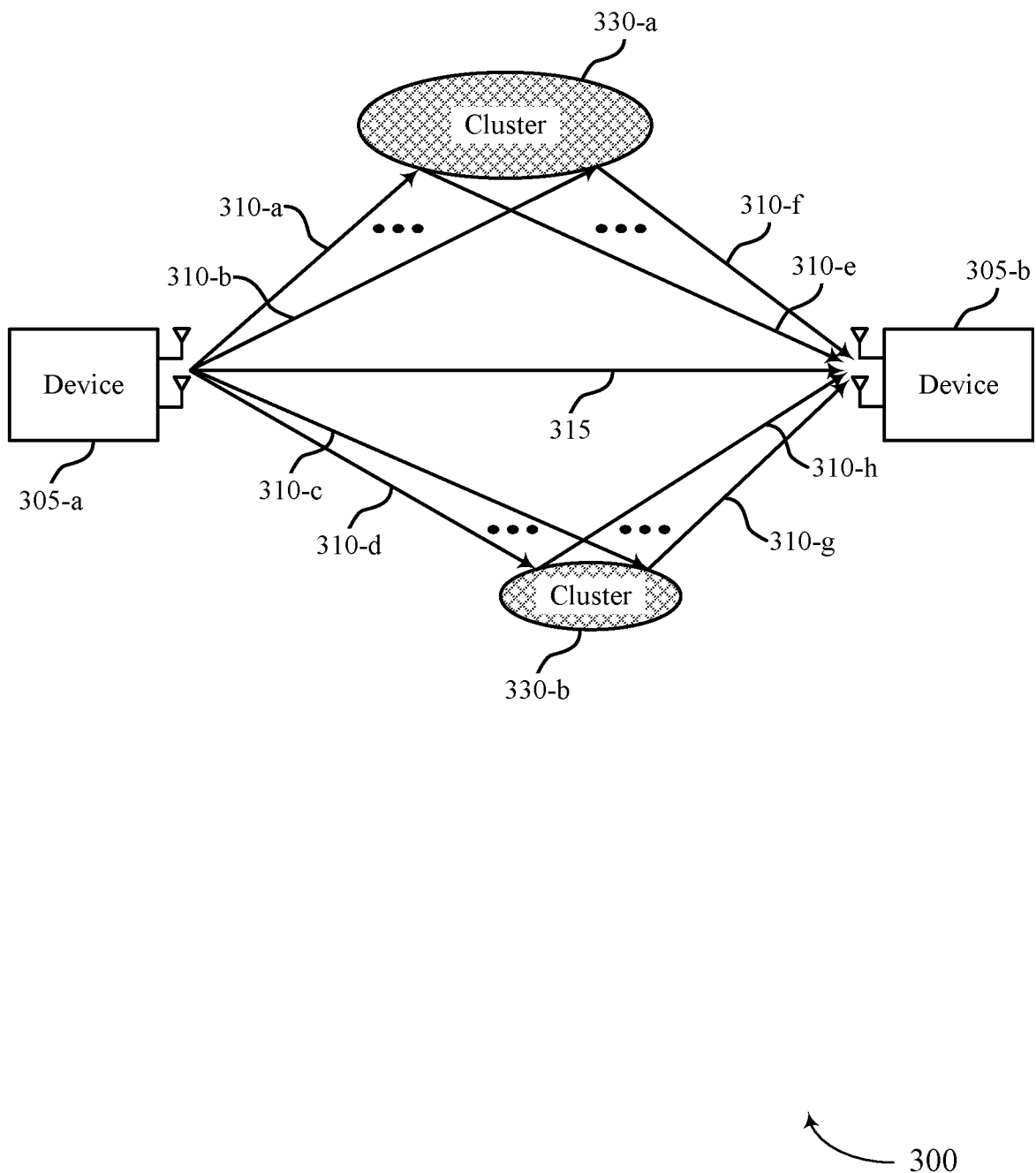
FIG. 3 illustrates an example of a sensing-assisted communication diagram that supports TCI state configuration for sensing-assisted communication in accordance with aspects of the present disclosure.

FIG. 3 illustrates an example of a sensing-assisted communication diagram 300 that supports TCI state configuration for sensing-assisted communication in accordance with aspects of the present disclosure. The sensing-assisted communication diagram 300 may implement or be implemented by aspects of the wireless communications systems 100 and 200. For example, the sensing-assisted communication diagram 300 illustrates monostatic and bistatic communications between a device 305-*a* and a device 305-*b*, which may represent examples of corresponding devices as described with reference to FIGS. 1 and 2. The devices 305 may each be a UE 115, a base station 105, or another wireless device.

The devices 305-*a* and 305-*b* may each support beamformed communications using a respective set of beams, as described with reference to FIG. 2. In the example of FIG. 3, the device 305-*a* may be an example of a transmitting device that has a message to transmit to the device 305-*b*, which may be an example of a receiving device. Each of the devices 305-*a* and 305-*b* may perform monostatic sensing of the environment to identify one or more clusters 330, which may represent examples of the clusters 230 described with reference to FIG. 2.

The devices 305-*a* and 305-*b* may perform monostatic sensing by transmitting one or more signals in one or more directions and monitoring for a reflection of the transmitted signals. The signals may reflect off of a physical object, such as a cluster 330 or another reflective object. The signals may be transmitted using radar, lidar, or both. The devices 305-a and 305-b may measure one or more parameters associated with each reflected signal. The one or more parameters may include a delay of the reflected signal (e.g., τ), an angle of the reflected signal (e.g., θ), a doppler associated with the signal, or any combination thereof.

The devices 305 may obtain parameters for one or more communication links 310. For example, the device 305-a may transmit signals in multiple directions and receive reflected signals via a first set of communication links 310 associated with the cluster 330-a and via a second set of communication links 310 associated with the cluster 330-b. The first set of communication links 310 may include the communication links 310-a, 310-b, and one or more other communication links 310, and the second set of communication links 310 may include the communication links 310-c, 310-d, and one or more other communication links 310. The communication links 310 may represent monostatic channels between the device 305-a and the clusters 330, which may be an example of the monostatic channel 225 described with reference to FIG. 2.

The devices 305 may group the parameters according to a communication link 310 and a corresponding cluster 330. For example, the device 305-a may obtain a first set of parameters associated with the cluster 330-a and a second set of parameters associated with the cluster 330-b. The first and second sets of parameters may each be grouped and assigned indices from 1 to M, where M may represent a quantity of communication links 310 associated with the cluster 330-a or the cluster 330-b, respectively. In such cases, the communication link 310-a may be associated with a first angle, $\theta_{A,1,1}$, and a first delay, $\tau_{A,1,1}$, and the communication link 310-b may be associated with a second angle, $\theta_{A,1,M}$, and a second delay, $\tau_{A,1,M}$, where the index 'A' corresponds to the device 305-a, the index 1 corresponds to the cluster 330-a, and the indices 1 to M correspond to the respective communication link 310. The device 305-b may similarly perform monostatic sensing and group the identified parameters per cluster 330 and communication link 310 (e.g., communication links 310-e, 310-f, 310-g, and 310-h).

The device 305-b may transmit a feedback message to the transmitting device 305-a to indicate sensing results obtained from the sensing procedure. The feedback message may represent an example of the feedback message 235 described with reference to FIG. 2. The device 305-b may, in some examples, transmit the feedback message to the device 305-a via a direct communication link 315 (e.g., an uplink, downlink, or sidelink communication link). The feedback message may include an index corresponding to each cluster 330 detected by the device 305-b (e.g., clusters 1 through M, where M may be two in the example of FIG. 3) and one or more parameters associated with each indexed cluster 330. The device 305-b may transmit each set of parameters obtained for each communication link 310 at the device 305-b via the feedback message. Additionally, or alternatively, the device 305-b may determine a mean value for each cluster 330 and transmit the mean values and a corresponding spread via the feedback message (e.g., an average delay, a delay spread, an average angle, an angle spread, and average doppler, a doppler spread, and the like).

In the example of FIG. 3, the device 305-b may obtain parameters for a first set of communication links 310 associated with the cluster 330-a, such as the communication links 310-e, 310-f, and one or more other communication links 310, and for a second set of communication links 310 associated with the cluster 330-b, such as the communication links 310-g, 310-h, and one or more other communication links 310. In some examples, the device 305-b may determine an average delay, an average doppler, an average angle, or any combination thereof for each of the first set of communication links 310 and the second set of communication links 310. The device 305-b may determine a corresponding spread for each parameter, where the spread may be associated with a range of the values obtained by the device 305-b. The mean values and corresponding spread values may be representative of an average monostatic channel between the respective cluster 330 and the device 305-b.

The feedback message may thereby include a set of one or more sensing results, where each sensing result may correspond to one or more parameters associated with a cluster 330. In some examples, the device 305-b may transmit an indication of a location, an orientation, a speed, or any combination thereof of the device 305-b via the feedback message in addition to the indication of the sensing results for each cluster 330.

The device 305-a may receive the feedback message including the sensing results obtained by the device 305-b. The device 305-a may utilize the sensing results in the feedback message and one or more sensing results associated with the communication links 310 at the device 305-a to infer a communication path via the reflection of a cluster 330 to use for communications with the device 305-b. The communication path may be referred to as a bistatic communication path, a bistatic channel, or a bistatic communication link. The cluster 330 associated with the bistatic communication path may be referred to as a target cluster 330. The device 305-a may infer the bistatic communication path based on an association of a sensing result obtained by the device 305-a and a sensing result included in the feedback message. For example, the device 305-a may determine that the parameters associated with the communication link 310-a at the device 305-a correspond to the parameters associated with the communication link 310-e indicated via the feedback message. The device 305-a may, in some examples, determine the association based on an index of the target cluster 330-a that corresponds to both of the communication links 310-a and 310-e.

The device 305-a may determine an angle, delay, and doppler of the potential bistatic communication channel between the device 305-a and the device 305-b based on the sensing results obtained by each device 305. For example, the device 305-a may assume a total delay associated with a bistatic communication path including the communication links 310-a and 310-e is the same as a sum of a first delay (e.g., $\tau_{A,1,1}$) of the communication link 310-a and a second delay (e.g., $\tau_{B,1,1}$) of the communication link 310-e as indicated via the feedback message. The device 305-a may determine an angle of departure and an angle of arrival of the bistatic communication channel based on a first angle (e.g., $\theta_{A,1,1}$) of the communication link 310-a and a second angle (e.g., $\theta_{B,1,1}$) of the communication link 310-e as indicated via the feedback message, respectively.

In some examples, a cluster 330 may be a mobile object, such as a vehicle. In such cases, the transmitting device 305-a may utilize the doppler information in the sensing results to prepare communications via the bistatic communication channel. For example, the device 305-a may identify the doppler associated with the communication link 310-a and a doppler associated with the communication link 310-e (e.g., based on the sensing results indicated via the feedback message), and the device 305-a may adjust a transmit beam, a receive beam, an angle of departure, an angle of arrival, or any combination thereof of the device 305-*a*, the device 305-*b*, or both to account for the mobile cluster 330-*a*. The device 305-*a* may additionally or alternatively compensate for a relative motion of the device 305-*b* based on a speed, location, or orientation of the device 305-*b*, as indicated via the feedback message. In some examples, the device 305-*a* may perform precoding to compensate for the delays, dopplers, angles, or any combination thereof indicated via the sensing results to improve the bistatic communication (e.g., to make the bistatic communication channel appear relatively flat at the device 305-*b*). In such cases, the device 305-*b* may estimate the bistatic channel over time with a reduced density of DMRSs due to the compensation of the channel based on the sensing results.

The device 305-*a* may transmit a data transmission (e.g., a PDSCH), a reference signal (e.g., a CSI-RS), or both in the direction of the potential bistatic communication channel based on inferring that the bistatic communication channel via the reflection of a cluster 330 is a feasible communication path. For example, the device 305-*a* may identify the bistatic communication path associated with the cluster 330-*a* and the device 305-*a* may transmit a PDSCH to the device 305-*b* in the direction of the communication link 310-*a*. Alternatively, the device 305-*a* may transmit a CSI-RS in the direction of the communication link 310-*a* (e.g., a precoded CSI-RS based on the assumed spatial delay and doppler parameters associated with the bistatic communication path) and determine whether the bistatic communication channel is feasible based on feedback received from the device 305-*b*.

In some cases, the monostatic sensing results from the devices 305-*a* and 305-*b* may not be fully representative of the bistatic channel, and the bistatic communication path may not be feasible. In such cases, the PDSCH transmission or the CSI-RS may not be received by the device 305-*b*, or the device 305-*b* may transmit feedback to the device 305-*a* that indicates a relatively low channel quality associated with the bistatic communication path. The device 305-*b* may transmit the feedback via the direct communication link 315, via the bistatic communication path, or both. In some examples, a target cluster 330 associated with a potential bistatic communication path may be shaped such that a signal transmitted by the device 305-*a* may not reflect in the direction of the device 305-*b*, and vice versa. For example, inferring a bistatic radar cross section (RCS) of a cluster 330 based on monostatic sensing results may not be robust or accurate. An RCS may correspond to a surface area of a cluster 330 that supports reflection of signals.

In some cases, a TCI state may be configured to define a QCL relationship of a downlink transmission with a previously transmitted downlink reference signal (e.g., a source reference signal associated with the direct communication link 315). However, such a TCI state may not be used for a bistatic communication path via a reflection of a cluster 330, and the device 305-*a* may not indicate which receive beam the receiving device 305-*b* should use to receive the PDSCH transmission or the CSI-RS transmitted via the bistatic channel. Instead of indicating a relationship between a transmission and a previously transmitted reference signal, it may be beneficial for a TCI state to indicate sensing feedback from the device 305-*b* that is associated with a communication link 310 in the direction of the target cluster 330 associated with the potential bistatic communication channel.

As described herein, the device 305-*a* may transmit a control message to the device 305-*b* that indicates an enhanced TCI state configured to define a QCL relationship between one or more target reference signals (e.g., CSI-RS or a DMRS of a PDSCH transmission) and one or more indices of sensing results associated with one or more target clusters 330 indicated via a feedback message. For example, if the device 305-*a* transmits a CSI-RS via a bistatic communication path, the device 305-*a* may transmit an indication of a TCI state to the device 305-*b*, where the TCI state indicates that the CSI-RS is spatially related to (e.g., "QCLed" with) an index to a target cluster 330 indicated in the feedback message (e.g., a target cluster 330 having an index, n, that corresponds to the bistatic communication path). The device 305-*a* may thereby indicate which transmit beam the device 305-*a* will use, which receive beam the device 305-*b* should use, or both to transmit and receive a bistatic transmission, respectively. The TCI state may refer to an index of a sensing result within a most recent feedback message received by the device 305-*a* or within another, previously transmitted, feedback message (e.g., the TCI state may indicate a slot associated with the feedback message), as described in further detail with reference to FIG. 2.

The device 305-*a* may transmit the control message prior to a transmission via the bistatic communication channel to indicate resource information associated with the transmission. For example, the control message may be a CSI-RS resource configuration for a CSI-RS transmission, DCI for a data transmission that includes the TCI state configuration, or some other control message, as described with reference to FIG. 2. The device 305-*a* may, in some examples, transmit the control message to the device 305-*b* directly via the direct communication link 315.

The device 305-*b* may identify a receive beam associated with the sensing result indicated via the TCI state. For example, if the TCI state indicates an index corresponding to the cluster 330-*b*, the device 305-*b* may identify a receive beam in the direction of the cluster 330-*b*, a receive beam used to perform monostatic sensing of a communication link 310 associated with the sensing result, or both. The device 305-*b* may use the identified receive beam to receive a transmission from the device 305-*a* via the bistatic channel.

By configuring a TCI state that relates a transmission to a monostatic sensing result, the device 305-*a* may support a more accurate and efficient beam selection procedure by the device 305-*b* as compared to techniques in which the device 305-*b* does not receive an indication of a receive beam to use for a bistatic communication.

Figure 4:
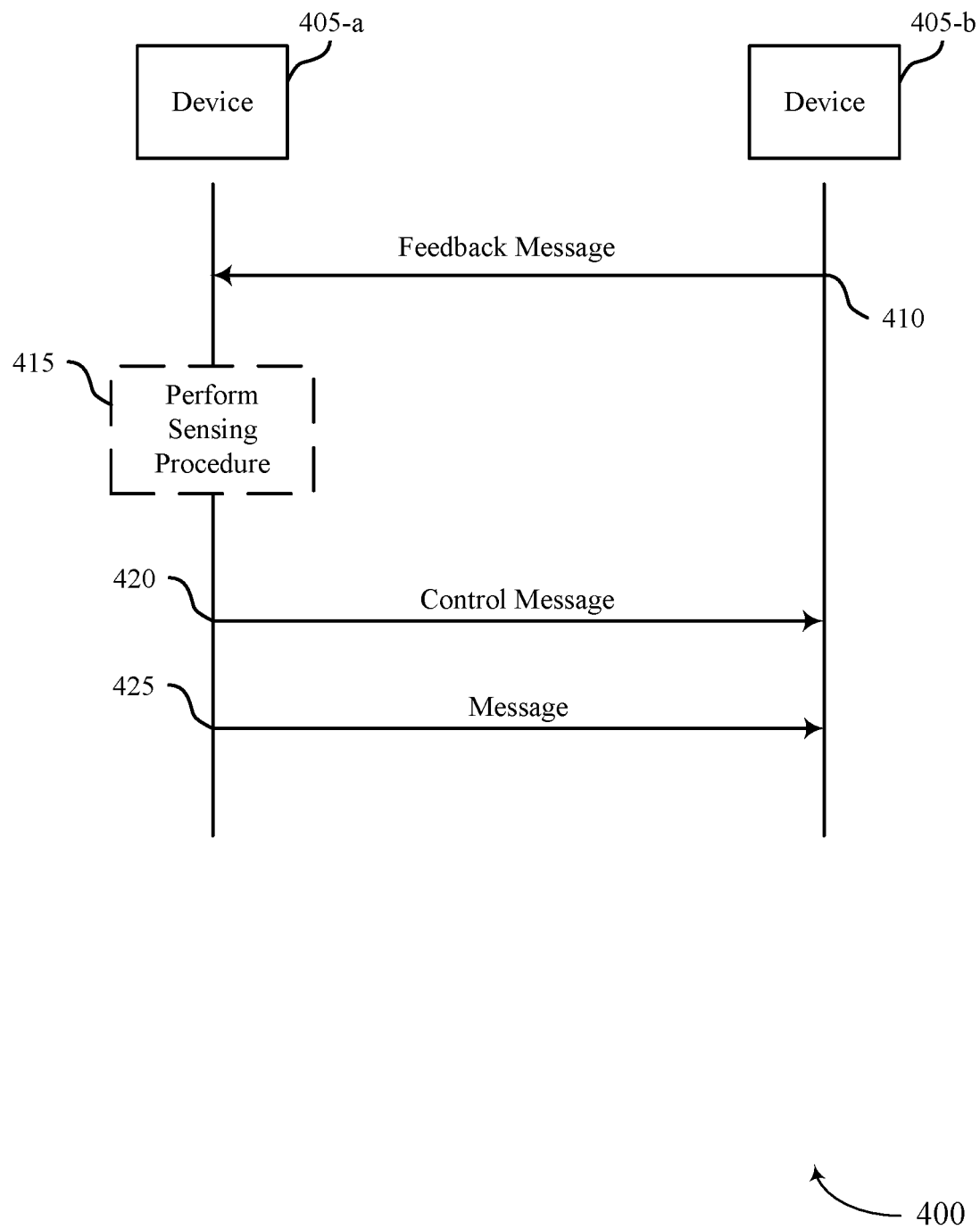
FIG. 4 illustrates an example of a process flow that supports TCI state configuration for sensing-assisted communication in accordance with aspects of the present disclosure.

FIG. 4 illustrates an example of a process flow 400 that supports TCI state configuration for sensing-assisted communication in accordance with aspects of the present disclosure. The process flow 400 may implement or be implemented by aspects of the wireless communications systems 100 and 200. For example, the process flow 400 illustrates communications between a device 405-*a* and a device 405-*b*, which may represent examples of corresponding devices as described with reference to FIGS. 1 through 3. The devices 405 may be UEs 115, base stations 105, or other wireless devices that support beamformed communications.

In the following description of the process flow 400, the operations between the device 405-*a* and the device 405-*b* may be performed in different orders or at different times. Some operations may also be left out of the process flow 400, or other operations may be added. Although the device 405-*a* and the device 405-*b* are shown performing the operations of the process flow 400, some aspects of some operations may also be performed by one or more other wireless devices.

At 410, the device 405-b may transmit a feedback message to the device 405-a. The feedback message may indicate a set of one or more sensing results associated with a sensing procedure performed by the device 405-b. In some examples, the sensing procedure may be a monostatic sensing procedure, as described with reference to FIGS. 2 and 3.

At 415, in some examples, the device 405-a may perform a sensing procedure. The device 405-a may obtain a second set of one or more sensing results based on performing the sensing procedure, which may be a monostatic sensing procedure. In some examples, the device 405-a may perform the sensing procedure before receiving the feedback message, after receiving the feedback message, or the device 405-a may refrain from performing the sensing procedure.

At 420, the device 405-a may transmit a control message to the device 405-b. The control message may indicate resource information for a message for the device 405-b. The control message may include an indication of a TCI state indicating a QCL relationship between a reference signal associated with the message (e.g., a target reference signal) and a sensing result of the set of one or more sensing results indicated by the feedback message. In some examples, the device 405-a may be referred to as a transmitting device and the device 405-b may be referred to as a receiving device.

In some examples, the message may be a reference signal, such as a CSI-RS, and the control message may be or may include a reference signal resource configuration (e.g., a CSI-RS resource configuration). Additionally, or alternatively, the message may be a physical data transmission, and the control message may be or may include DCI that indicates resource information for the message (e.g., schedules the message).

At 425, the device 405-a may transmit the message to the device 405-b using a transmit beam. The device 405-b may receive the message using a receive beam. The transmit beam, the receive beam, or both may be based on the TCI state and the QCL relationship. For example, the receive beam may be associated with the sensing result indicated via the QCL relationship. In some examples, the device 405-a may transmit the message to the device 405-b via a bistatic channel between the device 405-a and the device 405-b. The bistatic channel may be based on the set of one or more sensing results indicated via the feedback message, the second set of one or more sensing results obtained by a sensing procedure performed by the device 405-a (e.g., at 415), or both. By indicating a TCI state that defines a QCL relationship between a target reference signal and a sensing result, the devices 405 may thereby support improved beam selection for communications using a bistatic channel based on monostatic sensing results.

Figure 5:
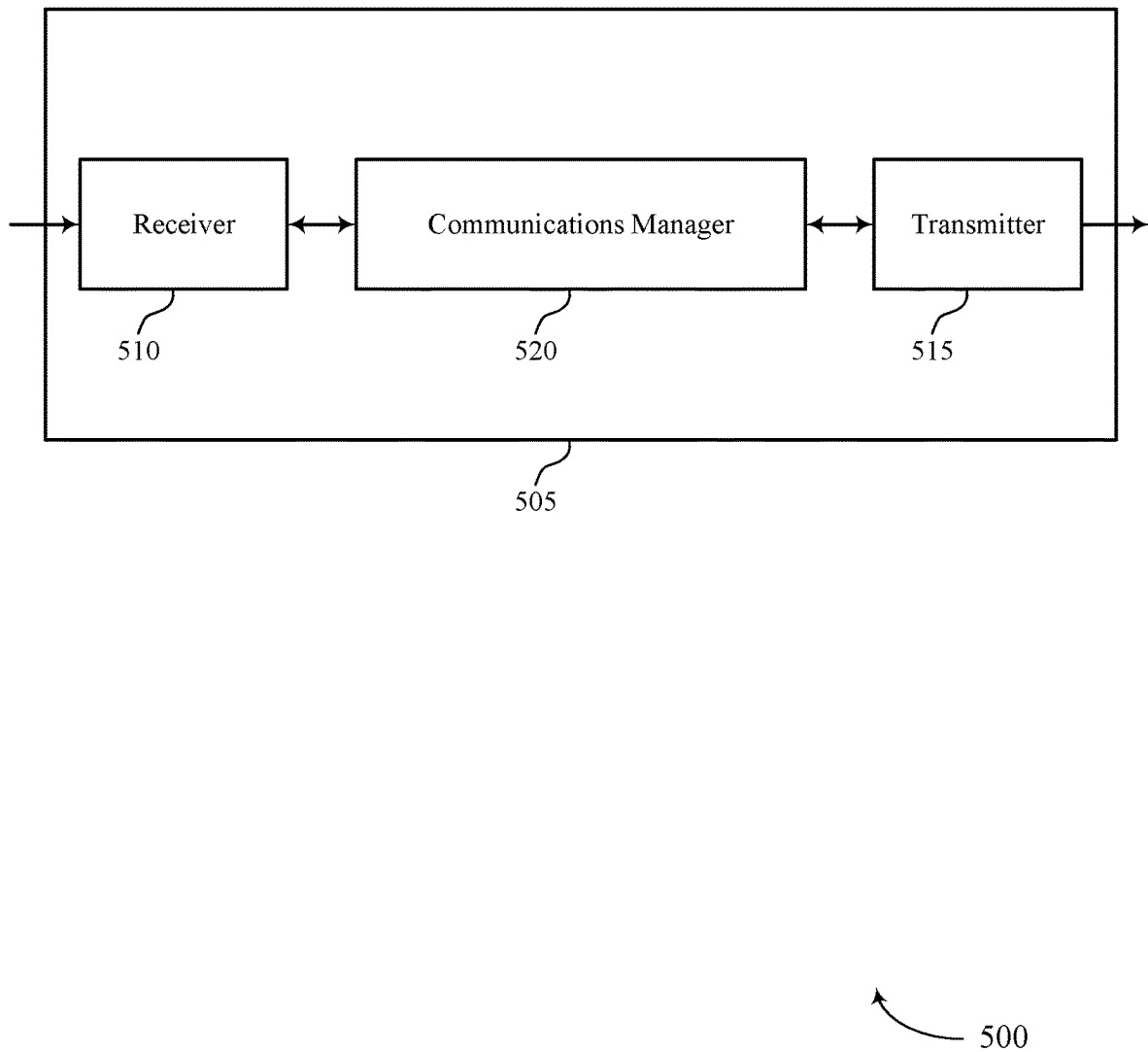
FIGS. 5 and 6 show block diagrams of devices that support TCI state configuration for sensing-assisted communication in accordance with aspects of the present disclosure.

FIG. 5 shows a block diagram 500 of a device 505 that supports TCI state configuration for sensing-assisted communication in accordance with aspects of the present disclosure. The device 505 may be an example of aspects of a UE 115 or a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to TCI state configuration for sensing-assisted communication). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to TCI state configuration for sensing-assisted communication). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of TCI state configuration for sensing-assisted communication as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first wireless device in accordance with examples as disclosed herein. For example, the communications manager 520 may be configured as or otherwise support a means for receiving, from a second wireless device, a feedback message that indicates a set of one or more sensing results associated with a sensing procedure performed by the second wireless device. The communications manager 520 may be configured as or otherwise support a means for transmitting, to the second wireless device, a control message indicating resource information for a message for the second wireless device, the control message including an indication of a TCI state indicating a QCL relationship between a reference signal associated with the message and a sensing result of the set of one or more sensing results indicated by the feedback message. The communications manager 520 may be configured as or otherwise support a means for transmitting, to the second wireless device, the message using a transmit beam based on the TCI state and the QCL relationship.

Additionally, or alternatively, the communications manager 520 may support wireless communication at a second wireless device in accordance with examples as disclosed herein. For example, the communications manager 520 may be configured as or otherwise support a means for transmitting, to a first wireless device, a feedback message that indicates a set of one or more sensing results associated with a sensing procedure performed by the second wireless device. The communications manager 520 may be configured as or otherwise support a means for receiving, from the first wireless device, a control message indicating resource information for a message for the second wireless device, the control message including an indication of a TCI state that indicates a QCL relationship between a reference signal associated with the message and a sensing result of the set of one or more sensing results indicated by the feedback message. The communications manager 520 may be configured as or otherwise support a means for receiving, from the first wireless device, the message using a receive beam based on the TCI state and the QCL relationship.

Figure 6:
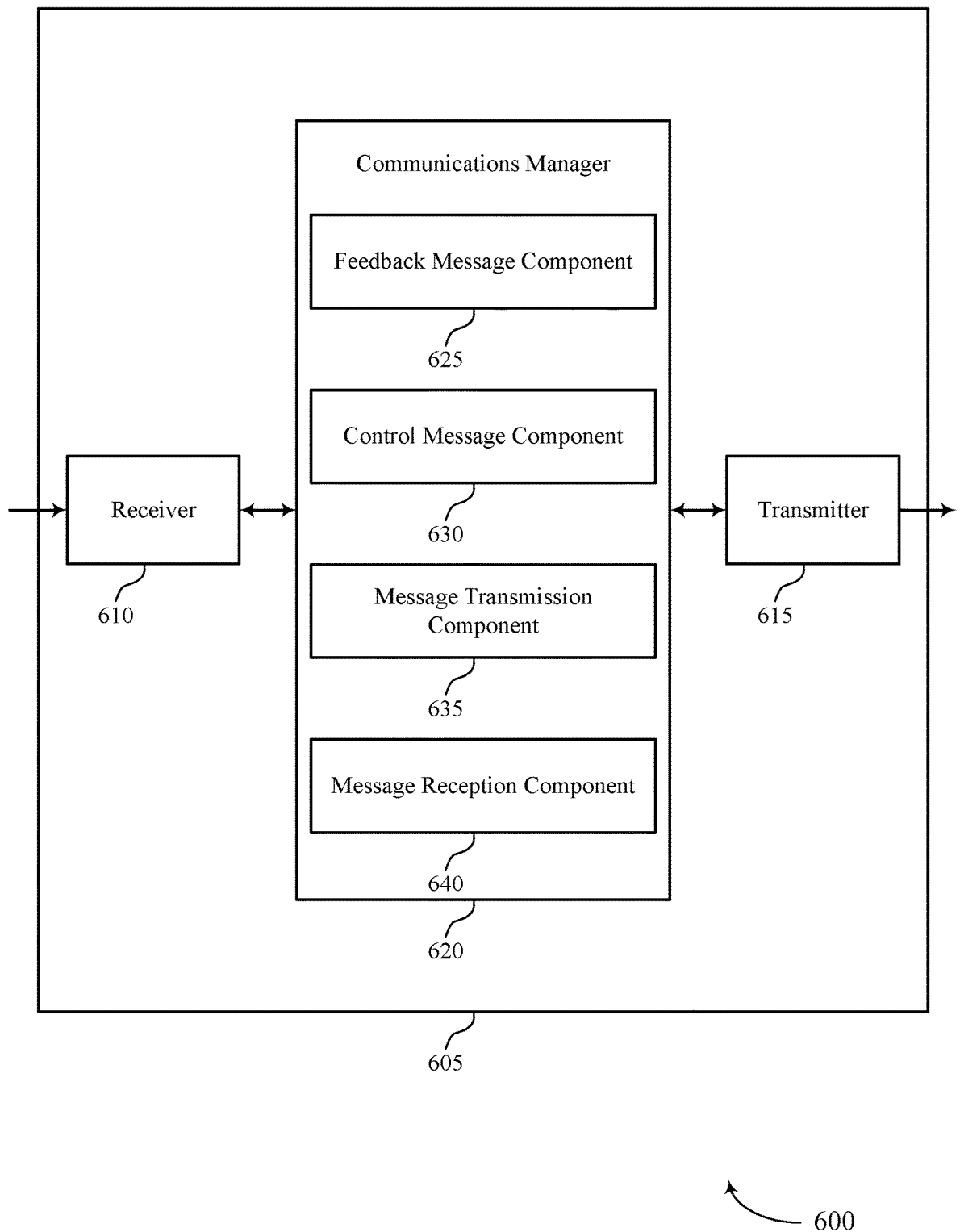

FIG. 6 shows a block diagram 600 of a device 605 that supports TCI state configuration for sensing-assisted communication in accordance with aspects of the present disclosure. The device 605 may be an example of aspects of a device 505, a UE 115, or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to TCI state configuration for sensing-assisted communication). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to TCI state configuration for sensing-assisted communication). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of TCI state configuration for sensing-assisted communication as described herein. For example, the communications manager 620 may include a feedback message component 625, a control message component 630, a message transmission component 635, a message reception component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first wireless device in accordance with examples as disclosed herein. The feedback message component 625 may be configured as or otherwise support a means for receiving, from a second wireless device, a feedback message that indicates a set of one or more sensing results associated with a sensing procedure performed by the second wireless device. The control message component 630 may be configured as or otherwise support a means for transmitting, to the second wireless device, a control message indicating resource information for a message for the second wireless device, the control message including an indication of a TCI state indicating a QCL relationship between a reference signal associated with the message and a sensing result of the set of one or more sensing results indicated by the feedback message. The message transmission component 635 may be configured as or otherwise support a means for transmitting, to the second wireless device, the message using a transmit beam based on the TCI state and the QCL relationship.

Additionally, or alternatively, the communications manager 620 may support wireless communication at a second wireless device in accordance with examples as disclosed herein. The feedback message component 625 may be configured as or otherwise support a means for transmitting, to a first wireless device, a feedback message that indicates a set of one or more sensing results associated with a sensing procedure performed by the second wireless device. The control message component 630 may be configured as or otherwise support a means for receive, from the first wireless device, a control message indicating resource information for a message for the second wireless device, the control message including an indication of a TCI state that indicates a QCL relationship between a reference signal associated with the message and a sensing result of the set of one or more sensing results indicated by the feedback message. The message reception component 640 may be configured as or otherwise support a means for receiving, from the first wireless device, the message using a receive beam based on the TCI state and the QCL relationship.

Figure 7:
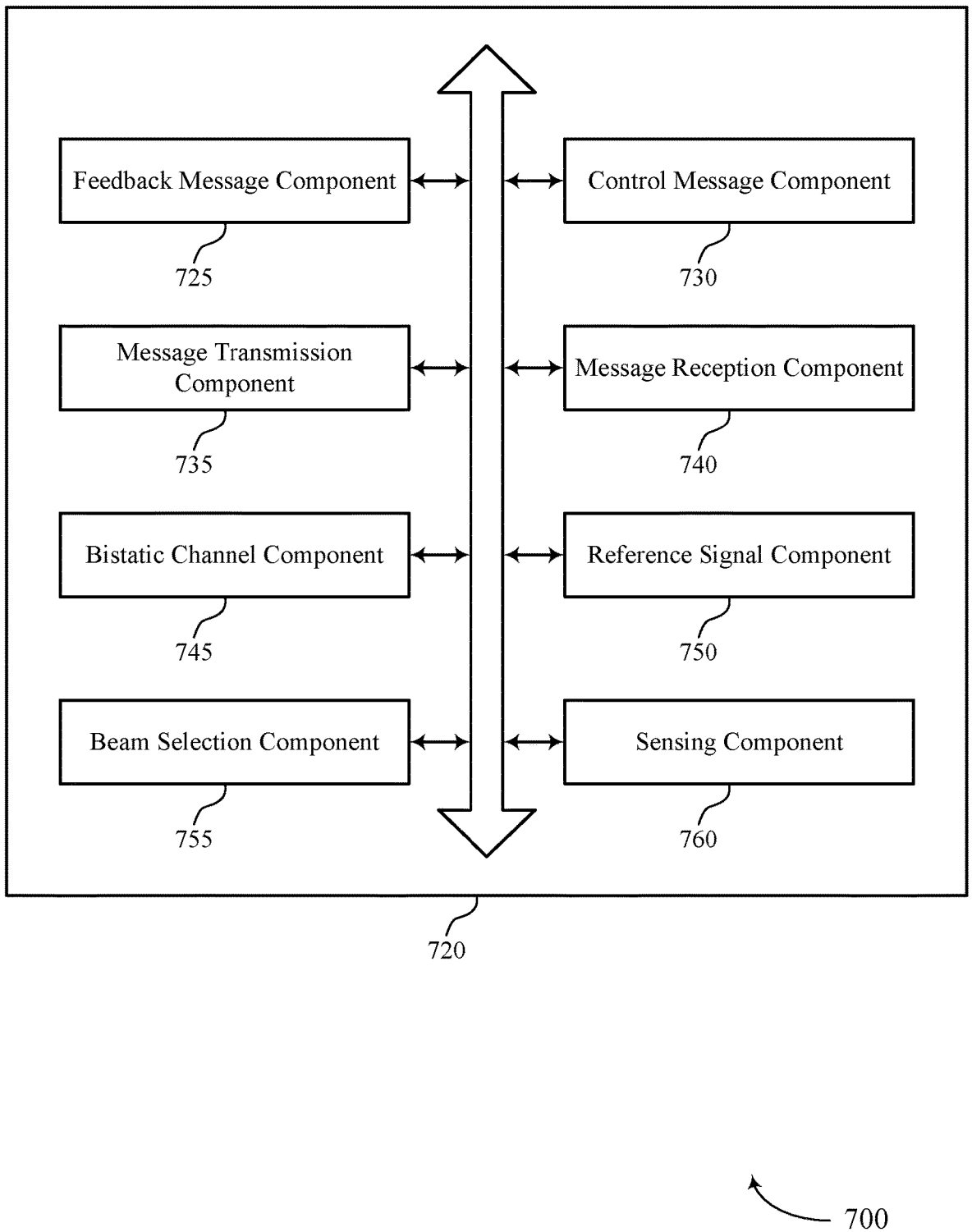
FIG. 7 shows a block diagram of a communications manager that supports TCI state configuration for sensing-assisted communication in accordance with aspects of the present disclosure.

FIG. 7 shows a block diagram 700 of a communications manager 720 that supports TCI state configuration for sensing-assisted communication in accordance with aspects of the present disclosure. The communications manager 720 may be an example of aspects of a communications manager 520, a communications manager 620, or both, as described herein. The communications manager 720, or various components thereof, may be an example of means for performing various aspects of TCI state configuration for sensing-assisted communication as described herein. For example, the communications manager 720 may include a feedback message component 725, a control message component 730, a message transmission component 735, a message reception component 740, a bistatic channel component 745, a reference signal component 750, a beam selection component 755, a sensing component 760, or any combination thereof. Each of these components may communicate, directly or indirectly, with one another (e.g., via one or more buses).

The communications manager 720 may support wireless communication at a first wireless device in accordance with examples as disclosed herein. The feedback message component 725 may be configured as or otherwise support a means for receiving, from a second wireless device, a feedback message that indicates a set of one or more sensing results associated with a sensing procedure performed by the second wireless device. The control message component 730 may be configured as or otherwise support a means for transmitting, to the second wireless device, a control message indicating resource information for a message for the second wireless device, the control message including an indication of a TCI state indicating a QCL relationship between a reference signal associated with the message and a sensing result of the set of one or more sensing results indicated by the feedback message. The message transmission component 735 may be configured as or otherwise support a means for transmitting, to the second wireless device, the message using a transmit beam based on the TCI state and the QCL relationship.

In some examples, to support transmitting the message, the bistatic channel component 745 may be configured as or otherwise support a means for transmitting the message via a bistatic channel between the first wireless device and the second wireless device, the bistatic channel based on the set of one or more sensing results, a second set of one or more sensing results associated with a second sensing procedure performed by the first wireless device, or both.

In some examples, the sensing component 760 may be configured as or otherwise support a means for performing the second sensing procedure by the first wireless device. In some examples, the sensing component 760 may be configured as or otherwise support a means for determining an association between the sensing result of the set of one or more sensing results indicated by the feedback message and a second sensing result of the second set of one or more sensing results associated with the second sensing procedure. In some examples, the message transmission component 735 may be configured as or otherwise support a means for transmitting the message via the bistatic channel based on the association.

In some examples, each sensing result of the set of one or more sensing results may indicate a first set of one or more parameters associated with a respective monostatic channel at the second wireless device. In some examples, each sensing result of the second set of one or more sensing results may indicate a second set of one or more parameters associated with a respective monostatic channel at the first wireless device. In some examples, each of the first set of one or more parameters and the second set of one or more parameters may include an angle, a delay, a doppler, a velocity, an angle spread, a delay spread, a doppler spread, or any combination thereof of the respective monostatic channel at the first wireless device or the second wireless device. In some examples, the sensing procedure, the second sensing procedure, or both include a radar sensing procedure or a lidar sensing procedure.

In some examples, the reference signal component 750 may be configured as or otherwise support a means for transmitting one or more reference signals associated with the message, the one or more reference signals including at least the reference signal, where the TCI state indicates the QCL relationship between the one or more reference signals associated with the message and a subset of one or more sensing results of the set of one or more sensing results indicated by the feedback message, the subset of one or more sensing results including at least the sensing result.

In some examples, to support transmitting the control message, the control message component 730 may be configured as or otherwise support a means for transmitting the control message including the indication of the QCL relationship between the reference signal and the sensing result of the set of one or more sensing results indicated by the feedback message based on a receive timing of the feedback message.

In some examples, the feedback message component 725 may be configured as or otherwise support a means for receiving the feedback message within a slot. In some examples, the control message component 730 may be configured as or otherwise support a means for transmitting the control message that indicates the QCL relationship and the slot in which the feedback message is received.

In some examples, to support receiving the feedback message, the feedback message component 725 may be configured as or otherwise support a means for receiving, via the feedback message, an indication of a location of the second wireless device, an orientation of the second wireless device, a speed of the second wireless device, or any combination thereof.

In some examples, to support transmitting the control message, the control message component 730 may be configured as or otherwise support a means for transmitting a reference signal resource configuration indicating the resource information for the message, where the message includes a CSI-RS.

In some examples, to support transmitting the control message, the control message component 730 may be configured as or otherwise support a means for transmitting DCI indicating the resource information for the message, where the message includes a physical data channel transmission. In some examples, each sensing result of the set of one or more sensing results may be associated with a respective receive beam of a set of multiple receive beams at the second wireless device.

Additionally, or alternatively, the communications manager 720 may support wireless communication at a second wireless device in accordance with examples as disclosed herein. In some examples, the feedback message component 725 may be configured as or otherwise support a means for transmitting, to a first wireless device, a feedback message that indicates a set of one or more sensing results associated with a sensing procedure performed by the second wireless device. In some examples, the control message component 730 may be configured as or otherwise support a means for receive, from the first wireless device, a control message indicating resource information for a message for the second wireless device, the control message including an indication of a TCI state that indicates a QCL relationship between a reference signal associated with the message and a sensing result of the set of one or more sensing results indicated by the feedback message. The message reception component 740 may be configured as or otherwise support a means for receiving, from the first wireless device, the message using a receive beam based on the TCI state and the QCL relationship.

In some examples, to support receiving the message, the bistatic channel component 745 may be configured as or otherwise support a means for receiving the message via a bistatic channel between the first wireless device and the second wireless device, the bistatic channel based on the set of one or more sensing results, a second set of one or more sensing results associated with a second sensing procedure performed by the first wireless device, or both. In some examples, the bistatic channel may be based on an association between the sensing result of the set of one or more sensing results indicated by the feedback message and a second sensing result of the second set of one or more sensing results associated with the second sensing procedure performed by the first wireless device.

In some examples, each sensing result of the set of one or more sensing results may indicate a first set of one or more parameters associated with a respective monostatic channel at the second wireless device. In some examples, each sensing result of the second set of one or more sensing results may indicate a second set of one or more parameters associated with a respective monostatic channel at the first wireless device. In some examples, each of the first set of one or more parameters and the second set of one or more parameters may include an angle, a delay, a doppler, a velocity, an angle spread, a delay spread, a doppler spread, or any combination thereof of the respective monostatic channel at the first wireless device or the second wireless device. In some examples, the sensing procedure, the second sensing procedure, or both may include a radar sensing procedure or a lidar sensing procedure.

In some examples, the reference signal component 750 may be configured as or otherwise support a means for receiving one or more reference signals associated with the message, the one or more reference signals including at least the reference signal, where the TCI state indicates the QCL relationship between the one or more reference signals associated with the message and a subset of one or more sensing results of the set of one or more sensing results indicated by the feedback message, the subset of one or more sensing results including at least the sensing result.

In some examples, to support receiving the control message, the control message component 730 may be configured as or otherwise support a means for receiving the control message including the indication of the QCL relationship between the reference signal and the sensing result of the set of one or more sensing results indicated by the feedback message based on a transmit timing associated with the feedback message.

In some examples, the feedback message component 725 may be configured as or otherwise support a means for transmitting the feedback message within a slot. In some examples, the control message component 730 may be configured as or otherwise support a means for receiving the control message that indicates the QCL relationship and the slot in which the feedback message is transmitted.

In some examples, to support transmitting the feedback message, the feedback message component 725 may be configured as or otherwise support a means for transmitting, via the feedback message, an indication of a location of the second wireless device, an orientation of the second wireless device, a speed of the second wireless device, or any combination thereof.

In some examples, to support receiving the control message, the control message component 730 may be configured as or otherwise support a means for receiving a reference signal resource configuration indicating the resource information for the message, where the message includes a CSI-RS. In some examples, to support receiving the control message, the control message component 730 may be configured as or otherwise support a means for receiving DCI indicating the resource information for the message, where the message includes a physical data channel transmission.

In some examples, the beam selection component 755 may be configured as or otherwise support a means for selecting the receive beam from a set of multiple receive beams at the second wireless device based on the QCL relationship indicating the sensing result, where each sensing result of the set of one or more sensing results may be associated with a respective receive beam of the set of multiple receive beams at the second wireless device.

Figure 8:
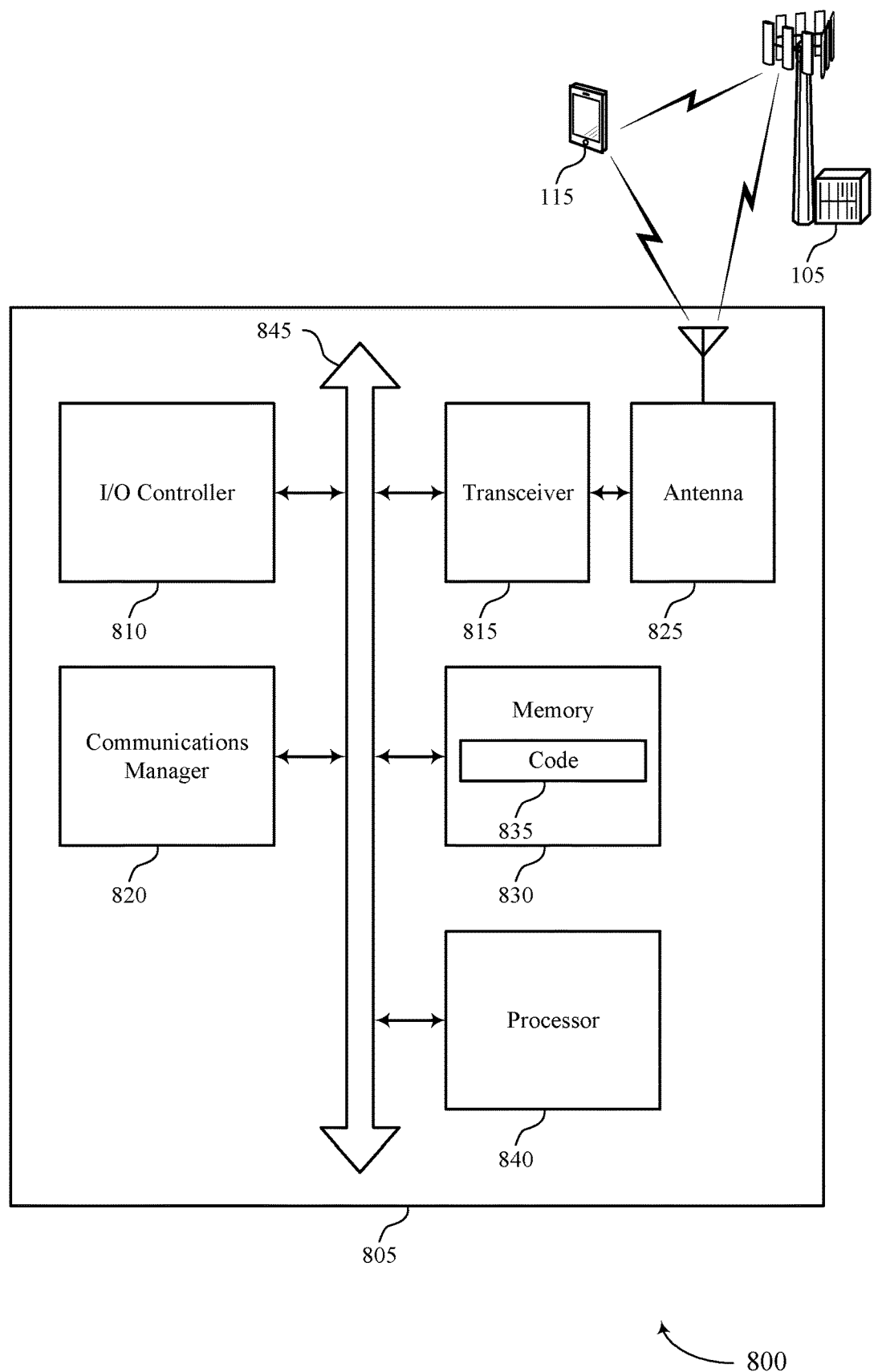
FIG. 8 shows a diagram of a system including a UE that supports TCI state configuration for sensing-assisted communication in accordance with aspects of the present disclosure.

FIG. 8 shows a diagram of a system 800 including a device 805 that supports TCI state configuration for sensing-assisted communication in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting TCI state configuration for sensing-assisted communication). For example, the device 805 or a component of the device 805 may include a processor 840 and memory 830 coupled to the processor 840, the processor 840 and memory 830 configured to perform various functions described herein.

The communications manager 820 may support wireless communication at a first wireless device in accordance with examples as disclosed herein. For example, the communications manager 820 may be configured as or otherwise support a means for receiving, from a second wireless device, a feedback message that indicates a set of one or more sensing results associated with a sensing procedure performed by the second wireless device. The communications manager 820 may be configured as or otherwise support a means for transmitting, to the second wireless device, a control message indicating resource information for a message for the second wireless device, the control message including an indication of a TCI state indicating a QCL relationship between a reference signal associated with the message and a sensing result of the set of one or more sensing results indicated by the feedback message. The communications manager 820 may be configured as or otherwise support a means for transmitting, to the second wireless device, the message using a transmit beam based on the TCI state and the QCL relationship.

Additionally, or alternatively, the communications manager 820 may support wireless communication at a second wireless device in accordance with examples as disclosed herein. For example, the communications manager 820 may be configured as or otherwise support a means for transmitting, to a first wireless device, a feedback message that indicates a set of one or more sensing results associated with a sensing procedure performed by the second wireless device. The communications manager 820 may be configured as or otherwise support a means for receiving, from the first wireless device, a control message indicating resource information for a message for the second wireless device, the control message including an indication of a TCI state that indicates a QCL relationship between a reference signal associated with the message and a sensing result of the set of one or more sensing results indicated by the feedback message. The communications manager 820 may be configured as or otherwise support a means for receiving, from the first wireless device, the message using a receive beam based on the TCI state and the QCL relationship.

By including or configuring the communications manager 820 in accordance with examples as described herein, the device 805 may support techniques for improved communication reliability, reduced latency, improved coordination between devices, and improved throughput. The device 805 may support a TCI state configuration that defines a QCL relationship between a target reference signal and a sensing result, as described herein. The QCL relationship may provide for the device 805 to support beamformed communications with another device via a bistatic channel (e.g., via a reflector or cluster), which may improve throughput of communications. In some examples, the device 805 may be a transmitting device 805, and the device 805 may receive a feedback message including a set of sensing results from a receiving device. The transmitting device 805 may indicate a TCI state associated with a transmit beam of the device 805 by indicating a relationship between the transmit beam and a sensing result of the set of sensing results indicated via the feedback message, which may improve coordination between devices and a reliability of the beam selection at the receiving device. Alternatively, the device 805 may be a receiving device 805, and the device 805 may select a receive beam to use for receiving a scheduled transmission based on a receive beam associated with a previously obtained sensing result indicated via the TCI state configuration, which may improve coordination between devices, communication reliability, and throughput.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of TCI state configuration for sensing-assisted communication as described herein, or the processor 840 and the memory 830 may be otherwise configured to perform or support such operations.

Figure 9:
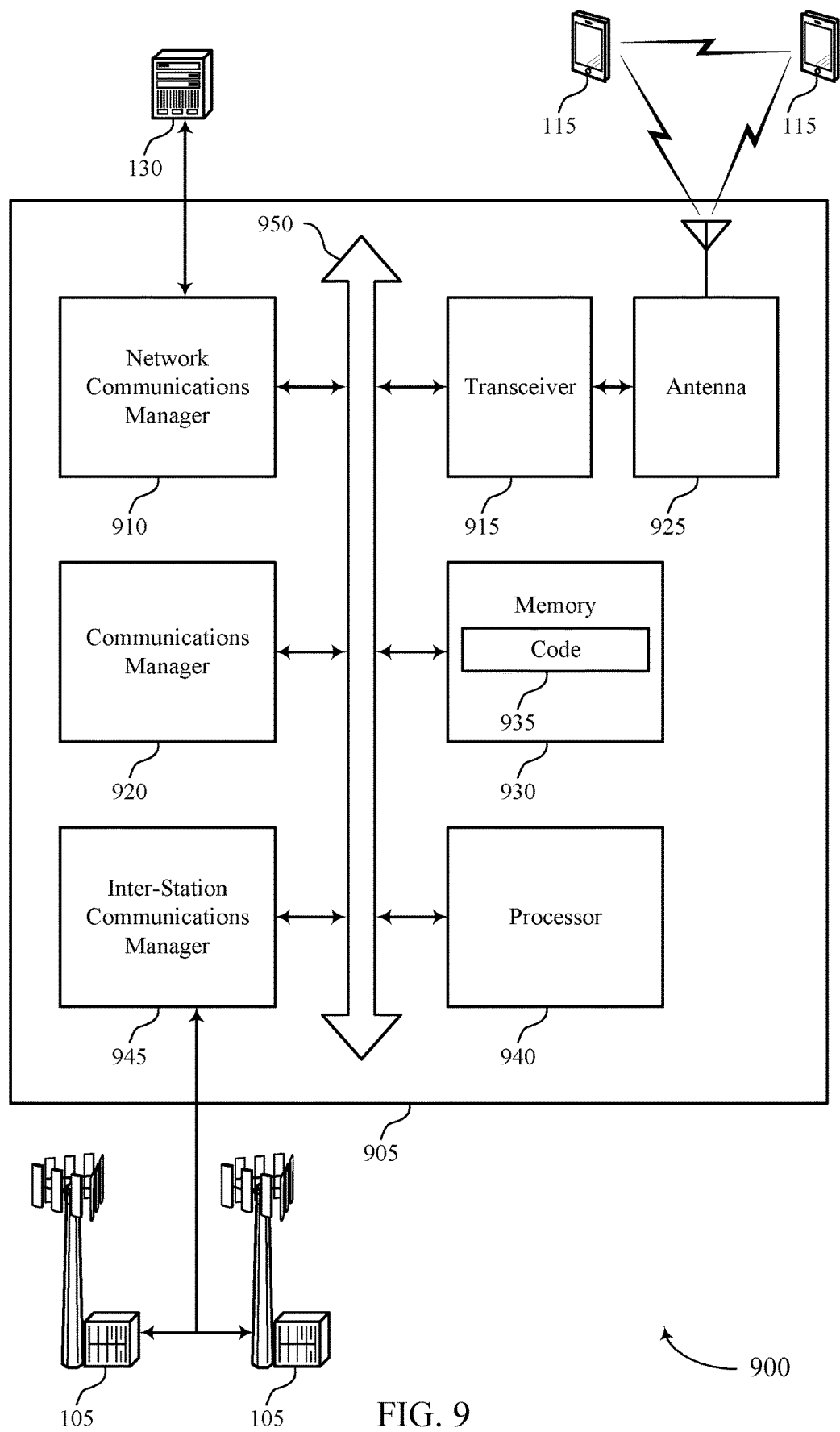
FIG. 9 shows a diagram of a system including a base station that supports TCI state configuration for sensing-assisted communication in accordance with aspects of the present disclosure.

FIG. 9 shows a diagram of a system 900 including a device 905 that supports TCI state configuration for sensing-assisted communication in accordance with aspects of the present disclosure. The device 905 may be an example of or include the components of a device 505, a device 605, or a base station 105 as described herein. The device 905 may communicate wirelessly with one or more base stations 105, UEs 115, or any combination thereof. The device 905 may include components for bi-directional voice and data communications including components for transmitting and receiving communications, such as a communications manager 920, a network communications manager 910, a transceiver 915, an antenna 925, a memory 930, code 935, a processor 940, and an inter-station communications manager 945. These components may be in electronic communication or otherwise coupled (e.g., operatively, communicatively, functionally, electronically, electrically) via one or more buses (e.g., a bus 950).

The network communications manager 910 may manage communications with a core network 130 (e.g., via one or more wired backhaul links). For example, the network communications manager 910 may manage the transfer of data communications for client devices, such as one or more UEs 115.

In some cases, the device 905 may include a single antenna 925. However, in some other cases the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 515, a transmitter 615, a receiver 510, a receiver 610, or any combination thereof or component thereof, as described herein.

The memory 930 may include RAM and ROM. The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a BIOS which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting TCI state configuration for sensing-assisted communication). For example, the device 905 or a component of the device 905 may include a processor 940 and memory 930 coupled to the processor 940, the processor 940 and memory 930 configured to perform various functions described herein.

The inter-station communications manager 945 may manage communications with other base stations 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, the inter-station communications manager 945 may provide an X2 interface within an LTE/LTE-A wireless communications network technology to provide communication between base stations 105.

The communications manager 920 may support wireless communication at a first wireless device in accordance with examples as disclosed herein. For example, the communications manager 920 may be configured as or otherwise support a means for receiving, from a second wireless device, a feedback message that indicates a set of one or more sensing results associated with a sensing procedure performed by the second wireless device. The communications manager 920 may be configured as or otherwise support a means for transmitting, to the second wireless device, a control message indicating resource information for a message for the second wireless device, the control message including an indication of a TCI state indicating a QCL relationship between a reference signal associated with the message and a sensing result of the set of one or more sensing results indicated by the feedback message. The communications manager 920 may be configured as or otherwise support a means for transmitting, to the second wireless device, the message using a transmit beam based on the TCI state and the QCL relationship.

Additionally, or alternatively, the communications manager 920 may support wireless communication at a second wireless device in accordance with examples as disclosed herein. For example, the communications manager 920 may be configured as or otherwise support a means for transmitting, to a first wireless device, a feedback message that indicates a set of one or more sensing results associated with a sensing procedure performed by the second wireless device. The communications manager 920 may be configured as or otherwise support a means for receiving, from the first wireless device, a control message indicating resource information for a message for the second wireless device, the control message including an indication of a TCI state that indicates a QCL relationship between a reference signal associated with the message and a sensing result of the set of one or more sensing results indicated by the feedback message. The communications manager 920 may be configured as or otherwise support a means for receiving, from the first wireless device, the message using a receive beam based on the TCI state and the QCL relationship.

By including or configuring the communications manager 920 in accordance with examples as described herein, the device 905 may support techniques for improved communication reliability, reduced latency, improved coordination between devices, land improved throughput. The device 905 may support a TCI state configuration that defines a QCL relationship between a target reference signal and a sensing result, as described herein. The QCL relationship may provide for the device 905 to support beamformed communications with another device via a bistatic channel (e.g., via a reflector or cluster), which may improve throughput of communications. In some examples, the device 905 may be a transmitting device 905, and the device 905 may receive a feedback message including a set of sensing results from a receiving device. The transmitting device 905 may indicate a TCI state associated with a transmit beam of the device 905 by indicating a relationship between the transmit beam and a sensing result of the set of sensing results indicated via the feedback message, which may improve coordination between devices and a reliability of the beam selection at the receiving device. Alternatively, the device 905 may be a receiving device 905, and the device 905 may select a receive beam to use for receiving a scheduled transmission based on a receive beam associated with a previously obtained sensing result indicated via the TCI state configuration, which may improve coordination between devices, communication reliability, and throughput.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of TCI state configuration for sensing-assisted communication as described herein, or the processor 940 and the memory 930 may be otherwise configured to perform or support such operations.

Figure 10:
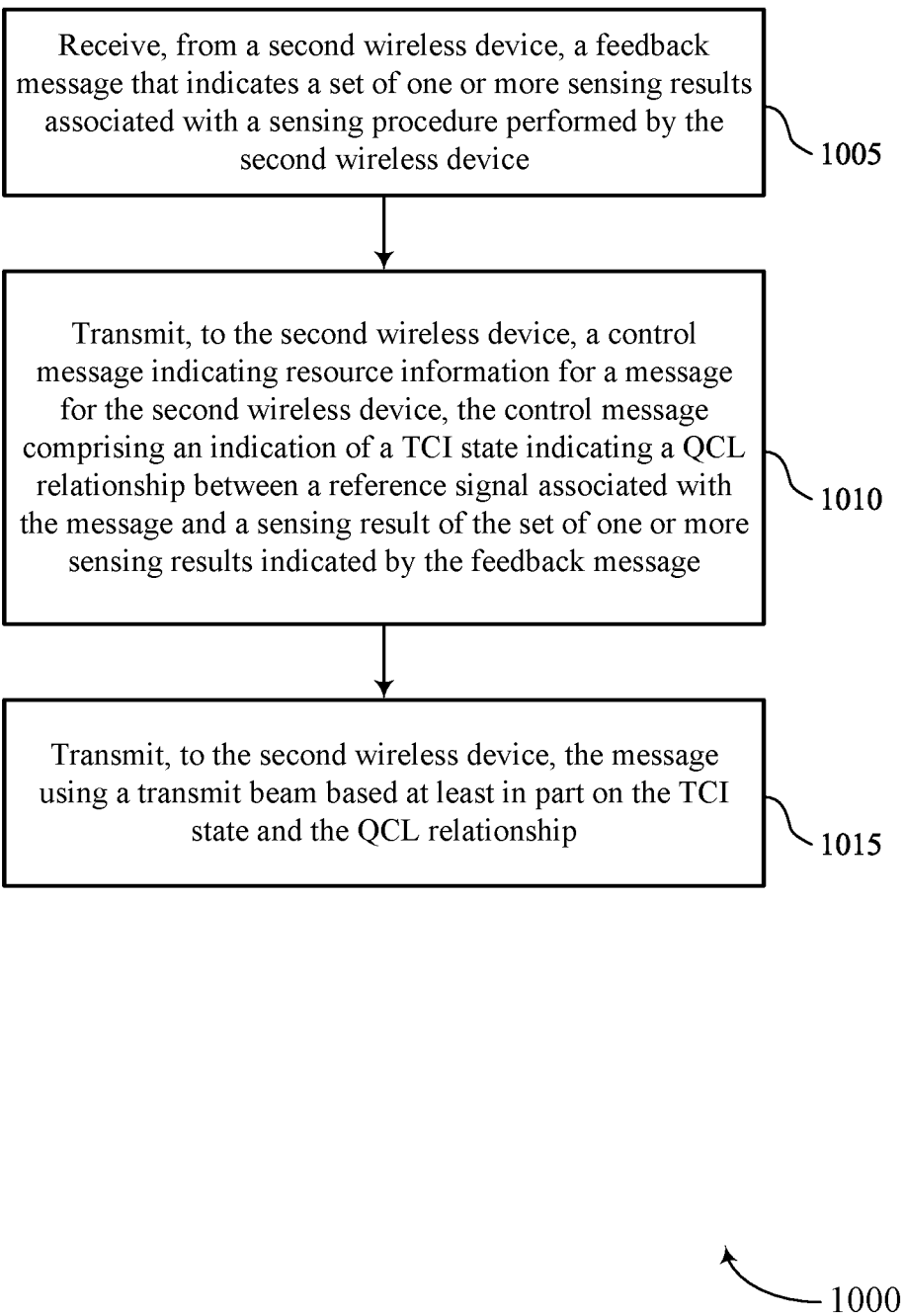
FIGS. 10 through 14 show flowcharts illustrating methods that support TCI state configuration for sensing-assisted communication in accordance with aspects of the present disclosure.

FIG. 10 shows a flowchart illustrating a method 1000 that supports TCI state configuration for sensing-assisted communication in accordance with aspects of the present disclosure. The operations of the method 1000 may be implemented by a UE or a base station or its components as described herein. For example, the operations of the method 1000 may be performed by a UE 115 or a base station 105 as described with reference to FIGS. 1 through 9. In some examples, a UE or a base station may execute a set of instructions to control the functional elements of the UE or the base station to perform the described functions. Additionally, or alternatively, the UE or the base station may perform aspects of the described functions using special-purpose hardware.

At 1005, the method may include receiving, from a second wireless device, a feedback message that indicates a set of one or more sensing results associated with a sensing procedure performed by the second wireless device. The operations of 1005 may be performed in accordance with examples as disclosed herein. In some examples, aspects of the operations of 1005 may be performed by a feedback message component 725 as described with reference to FIG. 7.

At 1010, the method may include transmitting, to the second wireless device, a control message indicating resource information for a message for the second wireless device, the control message including an indication of a TCI state indicating a QCL relationship between a reference signal associated with the message and a sensing result of the set of one or more sensing results indicated by the feedback message. The operations of 1010 may be performed in accordance with examples as disclosed herein. In some examples, aspects of the operations of 1010 may be performed by a control message component 730 as described with reference to FIG. 7.

At 1015, the method may include transmitting, to the second wireless device, the message using a transmit beam based on the TCI state and the QCL relationship. The operations of 1015 may be performed in accordance with examples as disclosed herein. In some examples, aspects of the operations of 1015 may be performed by a message transmission component 735 as described with reference to FIG. 7.

Figure 11:
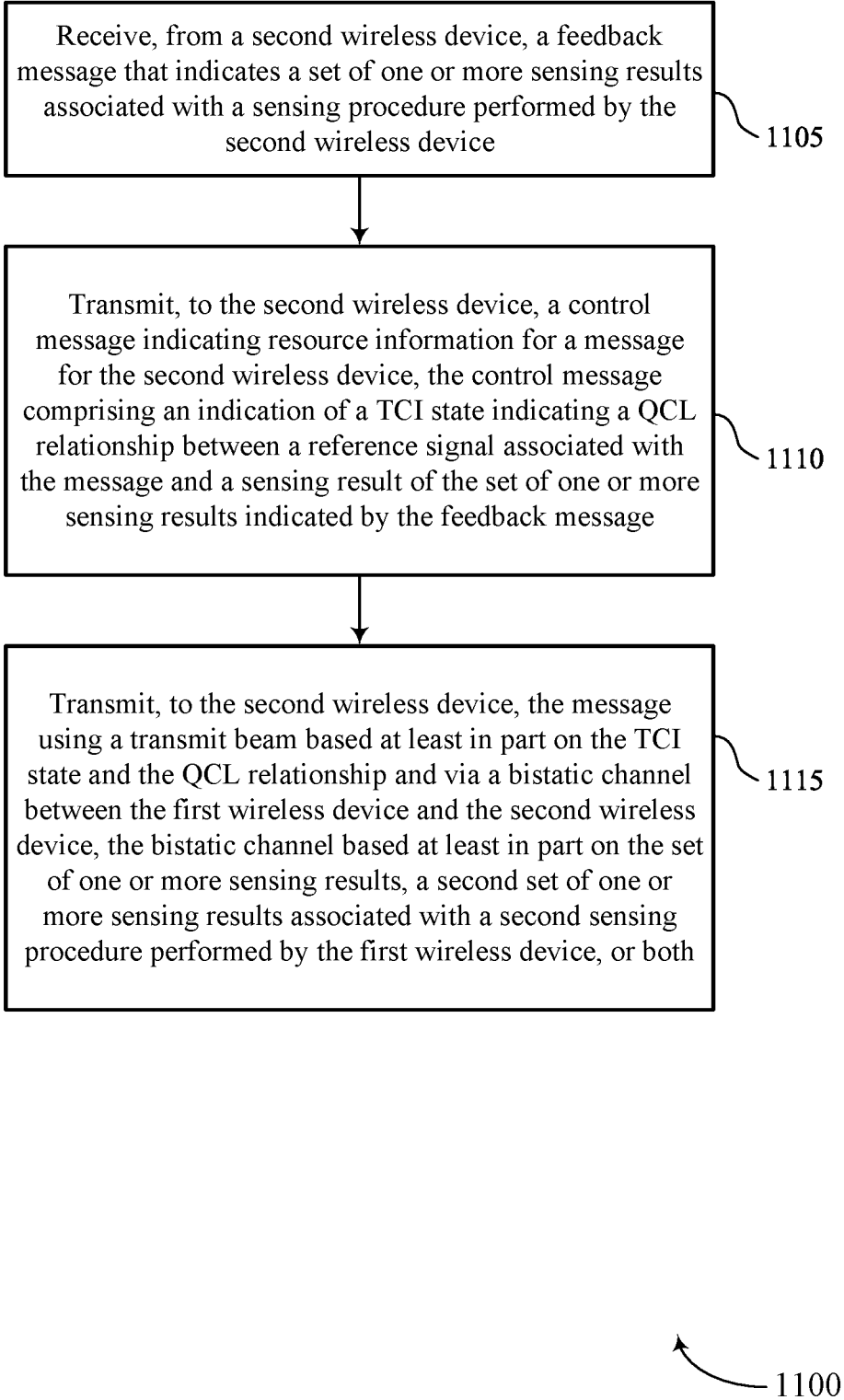

FIG. 11 shows a flowchart illustrating a method 1100 that supports TCI state configuration for sensing-assisted communication in accordance with aspects of the present disclosure. The operations of the method 1100 may be implemented by a UE or a base station or its components as described herein. For example, the operations of the method 1100 may be performed by a UE 115 or a base station 105 as described with reference to FIGS. 1 through 9. In some examples, a UE or a base station may execute a set of instructions to control the functional elements of the UE or the base station to perform the described functions. Additionally, or alternatively, the UE or the base station may perform aspects of the described functions using special-purpose hardware.

At 1105, the method may include receiving, from a second wireless device, a feedback message that indicates a set of one or more sensing results associated with a sensing procedure performed by the second wireless device. The operations of 1105 may be performed in accordance with examples as disclosed herein. In some examples, aspects of the operations of 1105 may be performed by a feedback message component 725 as described with reference to FIG. 7.

At 1110, the method may include transmitting, to the second wireless device, a control message indicating resource information for a message for the second wireless device, the control message including an indication of a TCI state indicating a QCL relationship between a reference signal associated with the message and a sensing result of the set of one or more sensing results indicated by the feedback message. The operations of 1110 may be performed in accordance with examples as disclosed herein. In some examples, aspects of the operations of 1110 may be performed by a control message component 730 as described with reference to FIG. 7.

At 1115, the method may include transmitting, to the second wireless device, the message using a transmit beam based on the TCI state and the QCL relationship and via a bistatic channel between the first wireless device and the second wireless device, the bistatic channel based on the set of one or more sensing results, a second set of one or more sensing results associated with a second sensing procedure performed by the first wireless device, or both. The operations of 1115 may be performed in accordance with examples as disclosed herein. In some examples, aspects of the operations of 1115 may be performed by a message transmission component 735 as described with reference to FIG. 7.

Figure 12:
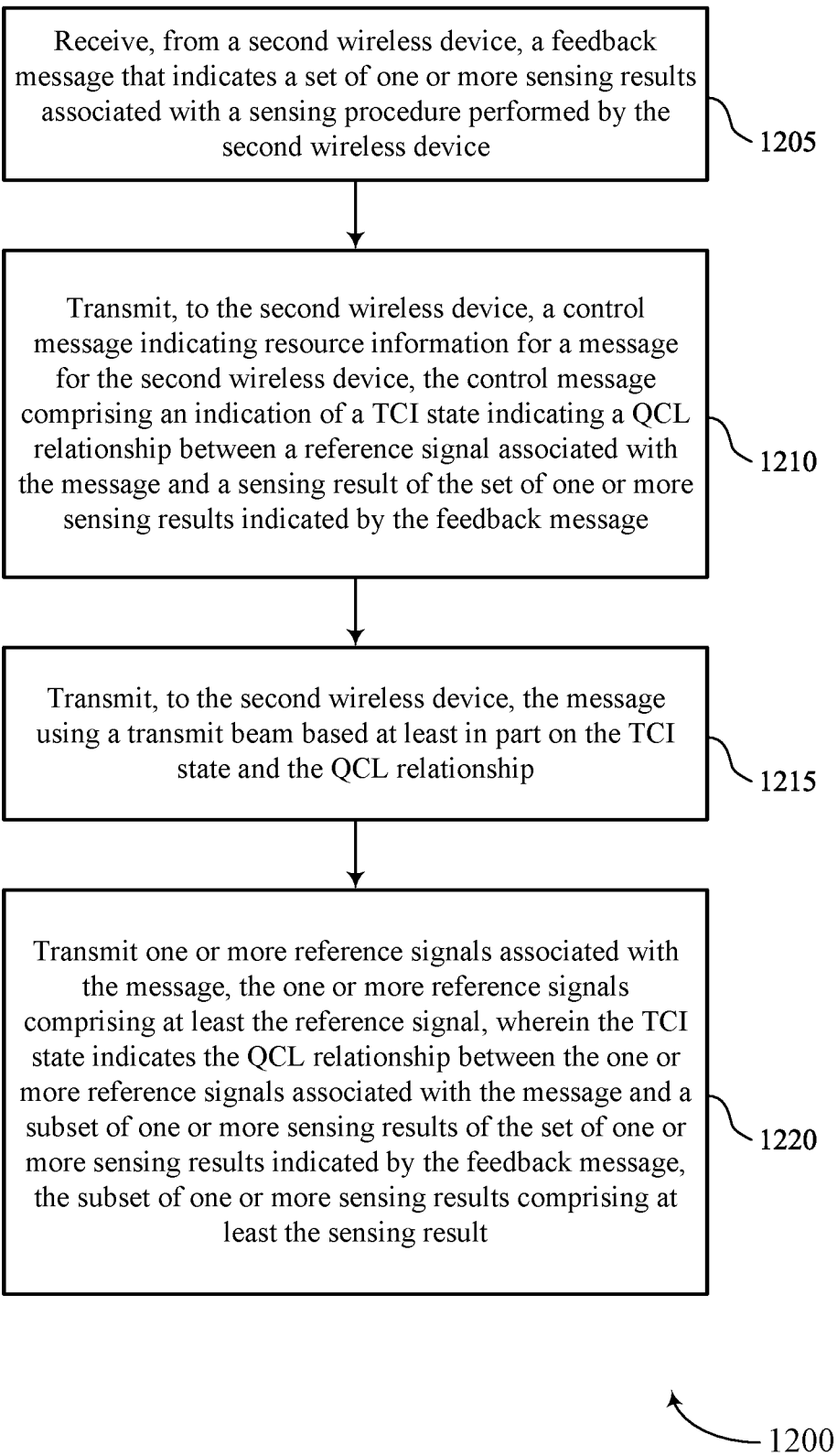

FIG. 12 shows a flowchart illustrating a method 1200 that supports TCI state configuration for sensing-assisted communication in accordance with aspects of the present disclosure. The operations of the method 1200 may be implemented by a UE or a base station or its components as described herein. For example, the operations of the method 1200 may be performed by a UE 115 or a base station 105 as described with reference to FIGS. 1 through 9. In some examples, a UE or a base station may execute a set of instructions to control the functional elements of the UE or the base station to perform the described functions. Additionally, or alternatively, the UE or the base station may perform aspects of the described functions using special-purpose hardware.

At 1205, the method may include receiving, from a second wireless device, a feedback message that indicates a set of one or more sensing results associated with a sensing procedure performed by the second wireless device. The operations of 1205 may be performed in accordance with examples as disclosed herein. In some examples, aspects of the operations of 1205 may be performed by a feedback message component 725 as described with reference to FIG. 7.

At 1210, the method may include transmitting, to the second wireless device, a control message indicating resource information for a message for the second wireless device, the control message including an indication of a TCI state indicating a QCL relationship between a reference signal associated with the message and a sensing result of the set of one or more sensing results indicated by the feedback message. The operations of 1210 may be performed in accordance with examples as disclosed herein. In some examples, aspects of the operations of 1210 may be performed by a control message component 730 as described with reference to FIG. 7.

At 1215, the method may include transmitting, to the second wireless device, the message using a transmit beam based on the TCI state and the QCL relationship. The operations of 1215 may be performed in accordance with examples as disclosed herein. In some examples, aspects of the operations of 1215 may be performed by a message transmission component 735 as described with reference to FIG. 7.

At 1220, the method may include transmitting one or more reference signals associated with the message, the one or more reference signals including at least the reference signal, where the TCI state indicates the QCL relationship between the one or more reference signals associated with the message and a subset of one or more sensing results of the set of one or more sensing results indicated by the feedback message, the subset of one or more sensing results including at least the sensing result. The operations of 1220 may be performed in accordance with examples as disclosed herein. In some examples, aspects of the operations of 1220 may be performed by a reference signal component 750 as described with reference to FIG. 7.

Figure 13:
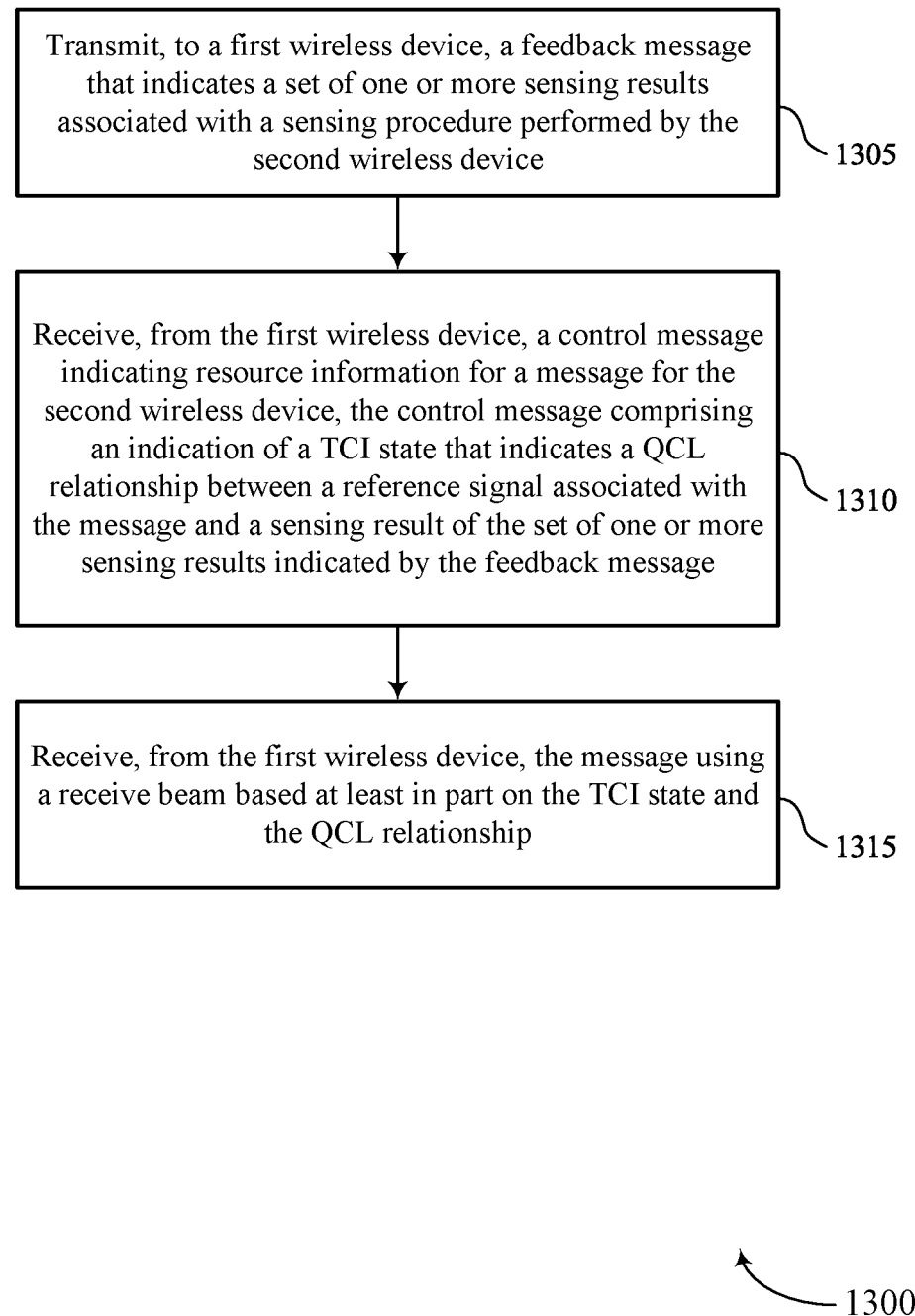

FIG. 13 shows a flowchart illustrating a method 1300 that supports TCI state configuration for sensing-assisted communication in accordance with aspects of the present disclosure. The operations of the method 1300 may be implemented by a UE or a base station or its components as described herein. For example, the operations of the method 1300 may be performed by a UE 115 or a base station 105 as described with reference to FIGS. 1 through 9. In some examples, a UE or a base station may execute a set of instructions to control the functional elements of the UE or the base station to perform the described functions. Additionally, or alternatively, the UE or the base station may perform aspects of the described functions using special-purpose hardware.

At 1305, the method may include transmitting, to a first wireless device, a feedback message that indicates a set of one or more sensing results associated with a sensing procedure performed by the second wireless device. The operations of 1305 may be performed in accordance with examples as disclosed herein. In some examples, aspects of the operations of 1305 may be performed by a feedback message component 725 as described with reference to FIG. 7.

At 1310, the method may include receive, from the first wireless device, a control message indicating resource information for a message for the second wireless device, the control message including an indication of a TCI state that indicates a QCL relationship between a reference signal associated with the message and a sensing result of the set of one or more sensing results indicated by the feedback message. The operations of 1310 may be performed in accordance with examples as disclosed herein. In some examples, aspects of the operations of 1310 may be performed by a control message component 730 as described with reference to FIG. 7.

At 1315, the method may include receiving, from the first wireless device, the message using a receive beam based on the TCI state and the QCL relationship. The operations of 1315 may be performed in accordance with examples as disclosed herein. In some examples, aspects of the operations of 1315 may be performed by a message reception component 740 as described with reference to FIG. 7.

Figure 14:
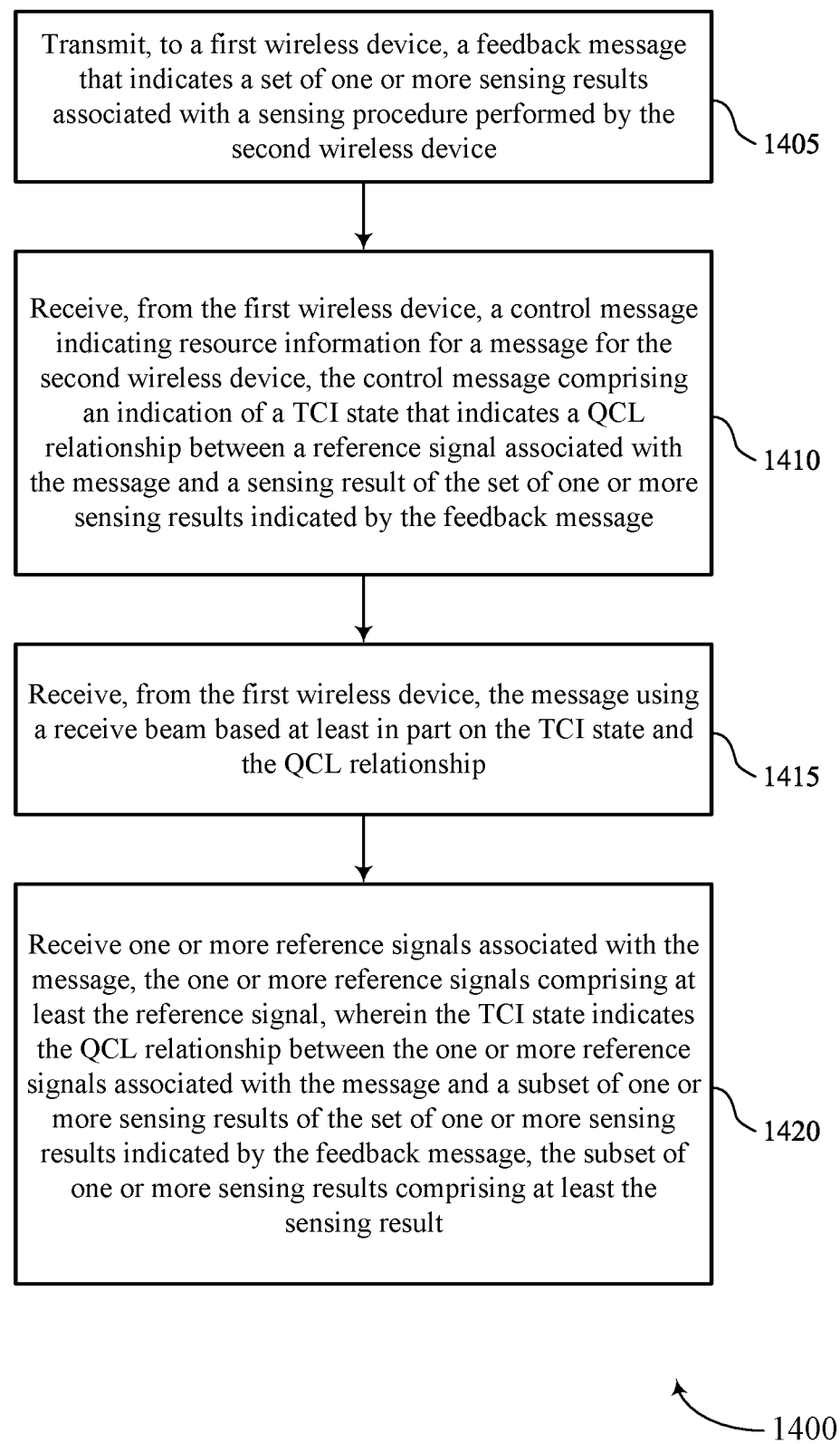

FIG. 14 shows a flowchart illustrating a method 1400 that supports TCI state configuration for sensing-assisted communication in accordance with aspects of the present disclosure. The operations of the method 1400 may be implemented by a UE or a base station or its components as described herein. For example, the operations of the method 1400 may be performed by a UE 115 or a base station 105 as described with reference to FIGS. 1 through 9. In some examples, a UE or a base station may execute a set of instructions to control the functional elements of the UE or the base station to perform the described functions. Additionally, or alternatively, the UE or the base station may perform aspects of the described functions using special-purpose hardware.

At 1405, the method may include transmitting, to a first wireless device, a feedback message that indicates a set of one or more sensing results associated with a sensing procedure performed by the second wireless device. The operations of 1405 may be performed in accordance with examples as disclosed herein. In some examples, aspects of the operations of 1405 may be performed by a feedback message component 725 as described with reference to FIG. 7.

At 1410, the method may include receive, from the first wireless device, a control message indicating resource information for a message for the second wireless device, the control message including an indication of a TCI state that indicates a QCL relationship between a reference signal associated with the message and a sensing result of the set of one or more sensing results indicated by the feedback message. The operations of 1410 may be performed in accordance with examples as disclosed herein. In some examples, aspects of the operations of 1410 may be performed by a control message component 730 as described with reference to FIG. 7.

At 1415, the method may include receiving, from the first wireless device, the message using a receive beam based on the TCI state and the QCL relationship. The operations of 1415 may be performed in accordance with examples as disclosed herein. In some examples, aspects of the operations of 1415 may be performed by a message reception component 740 as described with reference to FIG. 7.

At 1420, the method may include receiving one or more reference signals associated with the message, the one or more reference signals including at least the reference signal, where the TCI state indicates the QCL relationship between the one or more reference signals associated with the message and a subset of one or more sensing results of the set of one or more sensing results indicated by the feedback message, the subset of one or more sensing results including at least the sensing result. The operations of 1420 may be performed in accordance with examples as disclosed herein. In some examples, aspects of the operations of 1420 may be performed by a reference signal component 750 as described with reference to FIG. 7.

The following provides an overview of aspects of the present disclosure:

Aspect 1: A method for wireless communication at a first wireless device, comprising: receiving, from a second wireless device, a feedback message that indicates a set of one or more sensing results associated with a sensing procedure performed by the second wireless device; transmitting, to the second wireless device, a control message indicating resource information for a message for the second wireless device, the control message comprising an indication of a TCI state indicating a QCL relationship between a reference signal associated with the message and a sensing result of the set of one or more sensing results indicated by the feedback message; and transmitting, to the second wireless device, the message using a transmit beam based at least in part on the TCI state and the QCL relationship.

Aspect 2: The method of aspect 1, wherein transmitting the message comprises: transmitting the message via a bistatic channel between the first wireless device and the second wireless device, the bistatic channel based at least in part on the set of one or more sensing results, a second set of one or more sensing results associated with a second sensing procedure performed by the first wireless device, or both.

Aspect 3: The method of aspect 2, further comprising: performing the second sensing procedure by the first wireless device; determining an association between the sensing result of the set of one or more sensing results indicated by the feedback message and a second sensing result of the second set of one or more sensing results associated with the second sensing procedure; and transmitting the message via the bistatic channel based at least in part on the association.

Aspect 4: The method of any of aspects 2 through 3, wherein each sensing result of the set of one or more sensing results indicates a first set of one or more parameters associated with a respective monostatic channel at the second wireless device; each sensing result of the second set of one or more sensing results indicates a second set of one or more parameters associated with a respective monostatic channel at the first wireless device; and each of the first set of one or more parameters and the second set of one or more parameters comprises an angle, a delay, a doppler, a velocity, an angle spread, a delay spread, a doppler spread, or any combination thereof of the respective monostatic channel at the first wireless device or the second wireless device.

Aspect 5: The method of any of aspects 2 through 4, wherein the sensing procedure, the second sensing procedure, or both comprise a radar sensing procedure or a lidar sensing procedure.

Aspect 6: The method of any of aspects 1 through 5, further comprising: transmitting one or more reference signals associated with the message, the one or more reference signals comprising at least the reference signal, wherein the TCI state indicates the QCL relationship between the one or more reference signals associated with the message and a subset of one or more sensing results of the set of one or more sensing results indicated by the feedback message, the subset of one or more sensing results comprising at least the sensing result.

Aspect 7: The method of any of aspects 1 through 6, wherein transmitting the control message comprises: transmitting the control message comprising the indication of the QCL relationship between the reference signal and the sensing result of the set of one or more sensing results indicated by the feedback message based at least in part on a receive timing of the feedback message.

Aspect 8: The method of any of aspects 1 through 6, further comprising: receiving the feedback message within a slot; and transmitting the control message that indicates the QCL relationship and the slot in which the feedback message is received.

Aspect 9: The method of any of aspects 1 through 8, wherein receiving the feedback message comprises: receiving, via the feedback message, an indication of a location of the second wireless device, an orientation of the second wireless device, a speed of the second wireless device, or any combination thereof.

Aspect 10: The method of any of aspects 1 through 9, wherein transmitting the control message comprises: transmitting a reference signal resource configuration indicating the resource information for the transmission, wherein the message comprises a CSI-RS.

Aspect 11: The method of any of aspects 1 through 9, wherein transmitting the control message comprises: transmitting DCI indicating the resource information for the transmission, wherein the message comprises a physical data channel transmission.

Aspect 12: The method of any of aspects 1 through 11, wherein each sensing result of the set of one or more sensing results is associated with a respective receive beam of a plurality of receive beams at the second wireless device.

Aspect 13: A method for wireless communication at a second wireless device, comprising: transmitting, to a first wireless device, a feedback message that indicates a set of one or more sensing results associated with a sensing procedure performed by the second wireless device; receive, from the first wireless device, a control message indicating resource information for a message for the second wireless device, the control message comprising an indication of a TCI state that indicates a QCL relationship between a reference signal associated with the message and a sensing result of the set of one or more sensing results indicated by the feedback message; and receiving, from the first wireless device, the message using a receive beam based at least in part on the TCI state and the QCL relationship.

Aspect 14: The method of aspect 13, wherein receiving the message comprises: receiving the message via a bistatic channel between the first wireless device and the second wireless device, the bistatic channel based at least in part on the set of one or more sensing results, a second set of one or more sensing results associated with a second sensing procedure performed by the first wireless device, or both.

Aspect 15: The method of aspect 14, wherein the bistatic channel is based at least in part on an association between the sensing result of the set of one or more sensing results indicated by the feedback message and a second sensing result of the second set of one or more sensing results associated with the second sensing procedure performed by the first wireless device.

Aspect 16: The method of any of aspects 14 through 15, wherein each sensing result of the set of one or more sensing results indicates a first set of one or more parameters associated with a respective monostatic channel at the second wireless device; each sensing result of the second set of one or more sensing results indicates a second set of one or more parameters associated with a respective monostatic channel at the first wireless device; and each of the first set of one or more parameters and the second set of one or more parameters comprises an angle, a delay, a doppler, a velocity, an angle spread, a delay spread, a doppler spread, or any combination thereof of the respective monostatic channel at the first wireless device or the second wireless device.

Aspect 17: The method of any of aspects 14 through 16, wherein the sensing procedure, the second sensing procedure, or both comprise a radar sensing procedure or a lidar sensing procedure.

Aspect 18: The method of any of aspects 13 through 17, further comprising: receiving one or more reference signals associated with the message, the one or more reference signals comprising at least the reference signal, wherein the TCI state indicates the QCL relationship between the one or more reference signals associated with the transmission and a subset of one or more sensing results of the set of one or more sensing results indicated by the feedback message, the subset of one or more sensing results comprising at least the sensing result.

Aspect 19: The method of any of aspects 13 through 18, wherein receiving the control message comprises: receiving the control message comprising the indication of the QCL relationship between the reference signal and the sensing result of the set of one or more sensing results indicated by the feedback message based at least in part on a transmit timing associated with the feedback message.

Aspect 20: The method of any of aspects 13 through 18, further comprising: transmitting the feedback message within a slot; and receiving the control message that indicates the QCL relationship and the slot in which the feedback message is transmitted.

Aspect 21: The method of any of aspects 13 through 20, wherein transmitting the feedback message comprises: transmitting, via the feedback message, an indication of a location of the second wireless device, an orientation of the second wireless device, a speed of the second wireless device, or any combination thereof.

Aspect 22: The method of any of aspects 13 through 21, wherein receiving the control message comprises: receiving a reference signal resource configuration indicating the resource information for the message, wherein the message comprises a CSI-RS.

Aspect 23: The method of any of aspects 13 through 21, wherein receiving the control message comprises: receiving DCI indicating the resource information for the message, wherein the message comprises a physical data channel transmission.

Aspect 24: The method of any of aspects 13 through 23, further comprising: selecting the receive beam from a plurality of receive beams at the second wireless device based at least in part on the QCL relationship indicating the sensing result, wherein each sensing result of the set of one or more sensing results is associated with a respective receive beam of the plurality of receive beams at the second wireless device.

Aspect 25: An apparatus for wireless communication at a first wireless device, comprising a processor; memory coupled with the processor; and instructions stored in the memory and executable by the processor to cause the apparatus to perform a method of any of aspects 1 through 12.

Aspect 26: An apparatus for wireless communication at a first wireless device, comprising at least one means for performing a method of any of aspects 1 through 12.

Aspect 27: A non-transitory computer-readable medium storing code for wireless communication at a first wireless device, the code comprising instructions executable by a processor to perform a method of any of aspects 1 through 12.

Aspect 28: An apparatus for wireless communication at a second wireless device, comprising a processor; memory coupled with the processor; and instructions stored in the memory and executable by the processor to cause the apparatus to perform a method of any of aspects 13 through 24.

Aspect 29: An apparatus for wireless communication at a second wireless device, comprising at least one means for performing a method of any of aspects 13 through 24.

Aspect 30: A non-transitory computer-readable medium storing code for wireless communication at a second wireless device, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first wireless device, comprising:
  receiving, from a second wireless device, a feedback message that indicates a set of one or more sensing results associated with a sensing procedure performed by the second wireless device;
  transmitting, to the second wireless device, a control message indicating resource information for a message for the second wireless device, the control message comprising an indication of a transmission configuration indication state indicating a quasi-colocation relationship between a reference signal associated with the message and a sensing result of the set of one or more sensing results indicated by the feedback message; and
  transmitting, to the second wireless device via a bistatic channel between the first wireless device and the second wireless device, the message using a transmit beam based at least in part on the transmission configuration indication state and the quasi-colocation relationship, wherein the bistatic channel is based at least in part on the set of one or more sensing results, a second set of one or more sensing results associated with a second sensing procedure performed by the first wireless device, or both.

2. The method of claim 1, further comprising:
  performing the second sensing procedure by the first wireless device;
  determining an association between the sensing result of the set of one or more sensing results indicated by the feedback message and a second sensing result of the second set of one or more sensing results associated with the second sensing procedure; and
  transmitting the message via the bistatic channel based at least in part on the association.

3. The method of claim 1, wherein:
  each sensing result of the set of one or more sensing results indicates a respective first set of one or more parameters associated with a respective monostatic channel at the second wireless device;
  each sensing result of the second set of one or more sensing results indicates a respective second set of one or more parameters associated with a respective monostatic channel at the first wireless device; and
  each of the respective first set of one or more parameters and the respective second set of one or more parameters comprises an angle, a delay, a doppler, a velocity, an angle spread, a delay spread, a doppler spread, or any combination thereof of the respective monostatic channel at the first wireless device or the second wireless device.

4. The method of claim 1, wherein the sensing procedure, the second sensing procedure, or both comprise a radar sensing procedure or a lidar sensing procedure.

5. The method of claim 1, further comprising:
  transmitting one or more reference signals associated with the message, the one or more reference signals comprising at least the reference signal, wherein the transmission configuration indication state indicates the quasi-colocation relationship between the one or more reference signals associated with the message and a subset of one or more sensing results of the set of one or more sensing results indicated by the feedback message, the subset of one or more sensing results comprising at least the sensing result.

6. The method of claim 1, wherein transmitting the control message comprises:
transmitting the control message comprising the indication of the quasi-colocation relationship between the reference signal and the sensing result of the set of one or more sensing results indicated by the feedback message based at least in part on a receive timing of the feedback message.

7. The method of claim 1, further comprising:
receiving the feedback message within a slot; and
transmitting the control message that indicates the quasi-colocation relationship and the slot in which the feedback message is received.

8. The method of claim 1, wherein receiving the feedback message comprises:
receiving, via the feedback message, an indication of a location of the second wireless device, an orientation of the second wireless device, a speed of the second wireless device, or any combination thereof.

9. The method of claim 1, wherein transmitting the control message comprises:
transmitting a reference signal resource configuration indicating the resource information for the message, wherein the message comprises a channel state information reference signal.

10. The method of claim 1, wherein transmitting the control message comprises:
transmitting downlink control information indicating the resource information for the message, wherein the message comprises a physical data channel transmission.

11. The method of claim 1, wherein each sensing result of the set of one or more sensing results is associated with a respective receive beam of a plurality of receive beams at the second wireless device.

12. A method for wireless communication at a second wireless device, comprising:
transmitting, to a first wireless device, a feedback message that indicates a set of one or more sensing results associated with a sensing procedure performed by the second wireless device;
receive, from the first wireless device, a control message indicating resource information for a message for the second wireless device, the control message comprising an indication of a transmission configuration indication state that indicates a quasi-colocation relationship between a reference signal associated with the message and a sensing result of the set of one or more sensing results indicated by the feedback message; and
receiving, from the first wireless device via a bistatic channel between the first wireless device and the second wireless device, the message using a receive beam based at least in part on the transmission configuration indication state and the quasi-colocation relationship, wherein the bistatic channel is based at least in part on the set of one or more sensing results, a second set of one or more sensing results associated with a second sensing procedure performed by the first wireless device, or both.

13. The method of claim 12, wherein the bistatic channel is based at least in part on an association between the sensing result of the set of one or more sensing results indicated by the feedback message and a second sensing result of the second set of one or more sensing results associated with the second sensing procedure performed by the first wireless device.

14. The method of claim 12, wherein:
each sensing result of the set of one or more sensing results indicates a respective first set of one or more parameters associated with a respective monostatic channel at the second wireless device;
each sensing result of the second set of one or more sensing results indicates a respective second set of one or more parameters associated with a respective monostatic channel at the first wireless device; and
each of the respective first set of one or more parameters and the respective second set of one or more parameters comprises an angle, a delay, a doppler, a velocity, an angle spread, a delay spread, a doppler spread, or any combination thereof of the respective monostatic channel at the first wireless device or the second wireless device.

15. The method of claim 12, wherein the sensing procedure, the second sensing procedure, or both comprise a radar sensing procedure or a lidar sensing procedure.

16. The method of claim 12, further comprising:
receiving one or more reference signals associated with the message, the one or more reference signals comprising at least the reference signal, wherein the transmission configuration indication state indicates the quasi-colocation relationship between the one or more reference signals associated with the message and a subset of one or more sensing results of the set of one or more sensing results indicated by the feedback message, the subset of one or more sensing results comprising at least the sensing result.

17. The method of claim 12, wherein receiving the control message comprises:
receiving the control message comprising the indication of the quasi-colocation relationship between the reference signal and the sensing result of the set of one or more sensing results indicated by the feedback message based at least in part on a transmit timing associated with the feedback message.

18. The method of claim 12, further comprising:
transmitting the feedback message within a slot; and
receiving the control message that indicates the quasi-colocation relationship and the slot in which the feedback message is transmitted.

19. The method of claim 12, wherein transmitting the feedback message comprises:
transmitting, via the feedback message, an indication of a location of the second wireless device, an orientation of the second wireless device, a speed of the second wireless device, or any combination thereof.

20. The method of claim 12, wherein receiving the control message comprises:
receiving a reference signal resource configuration indicating the resource information for the message, wherein the message comprises a channel state information reference signal.

21. The method of claim 12, wherein receiving the control message comprises:
receiving downlink control information indicating the resource information for the message, wherein the message comprises a physical data channel transmission.

22. The method of claim 12, further comprising:
selecting the receive beam from a plurality of receive beams at the second wireless device based at least in part on the quasi-colocation relationship indicating the sensing result, wherein each sensing result of the set of one or more sensing results is associated with a respective receive beam of the plurality of receive beams at the second wireless device.

23. An apparatus for wireless communication at a first wireless device, comprising:
a processor;
memory coupled with the processor; and
instructions stored in the memory and executable by the processor to cause the apparatus to:
receive, from a second wireless device, a feedback message that indicates a set of one or more sensing results associated with a sensing procedure performed by the second wireless device;
transmit, to the second wireless device, a control message indicating resource information for a message for the second wireless device, the control message comprising an indication of a transmission configuration indication state indicating a quasi-colocation relationship between a reference signal associated with the message and a sensing result of the set of one or more sensing results indicated by the feedback message; and
transmit, to the second wireless device via a bistatic channel between the first wireless device and the second wireless device, the message using a transmit beam based at least in part on the transmission configuration indication state and the quasi-colocation relationship, wherein the bistatic channel is based at least in part on the set of one or more sensing results, a second set of one or more sensing results associated with a second sensing procedure performed by the first wireless device, or both.

24. The apparatus of claim 23, wherein the instructions are further executable by the processor to cause the apparatus to:
perform the second sensing procedure by the first wireless device;
determine an association between the sensing result of the set of one or more sensing results indicated by the feedback message and a second sensing result of the second set of one or more sensing results associated with the second sensing procedure; and
transmit the message via the bistatic channel based at least in part on the association.

25. An apparatus for wireless communication at a second wireless device, comprising:
a processor;
memory coupled with the processor; and
instructions stored in the memory and executable by the processor to cause the apparatus to:
transmit, to a first wireless device, a feedback message that indicates a set of one or more sensing results associated with a sensing procedure performed by the second wireless device;
receive, from the first wireless device, a control message indicating resource information for a message for the second wireless device, the control message comprising an indication of a transmission configuration indication state that indicates a quasi-colocation relationship between a reference signal associated with the message and a sensing result of the set of one or more sensing results indicated by the feedback message; and
receive, from the first wireless device via a bistatic channel between the first wireless device and the second wireless device, the message using a receive beam based at least in part on the transmission configuration indication state and the quasi-colocation relationship, wherein the bistatic channel is based at least in part on the set of one or more sensing results, a second set of one or more sensing results associated with a second sensing procedure performed by the first wireless device, or both.

26. The apparatus of claim 25, wherein the instructions are further executable by the processor to cause the apparatus to:
receive one or more reference signals associated with the message, the one or more reference signals comprising at least the reference signal, wherein the transmission configuration indication state indicates the quasi-colocation relationship between the one or more reference signals associated with the message and a subset of one or more sensing results of the set of one or more sensing results indicated by the feedback message, the subset of one or more sensing results comprising at least the sensing result.

* * * * *